United States Patent
Waters et al.

(10) Patent No.: US 7,877,369 B2
(45) Date of Patent: Jan. 25, 2011

(54) HOSTED SEARCHING OF PRIVATE LOCAL AREA NETWORK INFORMATION

(75) Inventors: Christopher Waters, Los Altos, CA (US); Brian de Haaff, Menlo Park, CA (US)

(73) Assignee: Paglo Labs, Inc., Palo Alto, CA (US)

( * ) Notice: Subject to any disclaimer, the term of this patent is extended or adjusted under 35 U.S.C. 154(b) by 509 days.

(21) Appl. No.: 11/982,542

(22) Filed: Nov. 2, 2007

(65) Prior Publication Data

US 2009/0119256 A1    May 7, 2009

(51) Int. Cl.
G06F 7/00 (2006.01)
G06F 17/30 (2006.01)

(52) U.S. Cl. .................. 707/706; 707/802; 709/224

(58) Field of Classification Search .......... 707/999.003, 707/999.005, 999.102, 706, 802; 709/203, 709/223, 224
See application file for complete search history.

(56) References Cited

U.S. PATENT DOCUMENTS

| | | | |
|---|---|---|---|
| 5,845,278 A | 12/1998 | Kirsch et al. | |
| 5,935,210 A | 8/1999 | Stark | |
| 6,199,062 B1 * | 3/2001 | Byrne et al. | 707/999.003 |
| 6,263,364 B1 | 7/2001 | Najork et al. | |
| 6,351,755 B1 | 2/2002 | Najork et al. | |
| 6,356,892 B1 * | 3/2002 | Corn et al. | 707/999.003 |
| 6,424,966 B1 | 7/2002 | Meyerzon et al. | |
| 6,438,539 B1 | 8/2002 | Korolev et al. | |
| 6,463,430 B1 * | 10/2002 | Brady et al. | 707/999.003 |
| 6,581,072 B1 | 6/2003 | Mathur et al. | |
| 6,609,124 B2 | 8/2003 | Chow et al. | |
| 6,611,835 B1 | 8/2003 | Huang et al. | |
| 6,675,387 B1 | 1/2004 | Boucher et al. | |
| 6,678,694 B1 | 1/2004 | Zimmermann et al. | |
| 6,714,933 B2 | 3/2004 | Musgrove et al. | |
| 6,842,761 B2 | 1/2005 | Diamond et al. | |
| 6,847,967 B1 | 1/2005 | Takano | |
| 6,847,977 B2 | 1/2005 | Abajian | |
| 6,874,019 B2 | 3/2005 | Hamilton, III et al. | |
| 6,952,730 B1 | 10/2005 | Najork et al. | |
| 6,996,798 B2 | 2/2006 | Ali et al. | |

(Continued)

FOREIGN PATENT DOCUMENTS

WO    WO/2004/038528    5/2004

OTHER PUBLICATIONS

"LAN Crawler 1.0", FileDudes.com, Oct. 15, 2007, 2 pages.

(Continued)

Primary Examiner—John E Breene
Assistant Examiner—Phong Nguyen
(74) Attorney, Agent, or Firm—McDermott Will & Emery LLP

(57) ABSTRACT

Hosted searching of different local area network (LAN) information is described. The apparatus for hosted searching of different private LAN information includes a LAN crawler to automatically and repeatedly crawl a LAN having multiple devices, and a hosted on-demand search system including a set of one or more centralized-search servers to create and synchronize a separate private search database for each of the private LANs based on received reports from of different instances of the LAN crawler deployed on the multiple private LANs, at least some of which are operated by different entities.

21 Claims, 10 Drawing Sheets

U.S. PATENT DOCUMENTS

| | | | |
|---|---|---|---|
| 7,017,183 | B1 | 3/2006 | Frey et al. |
| 7,080,073 | B1 | 7/2006 | Jiang et al. |
| 7,124,127 | B2 | 10/2006 | Sakamoto et al. |
| 7,139,747 | B1 | 11/2006 | Najork |
| 7,158,986 | B1 | 1/2007 | Oliver et al. |
| 7,231,395 | B2 | 6/2007 | Fain et al. |
| 7,231,405 | B2 | 6/2007 | Xia |
| 7,313,581 | B1* | 12/2007 | Bachmann et al. .......... 707/759 |
| 7,689,387 | B2* | 3/2010 | Mathews et al. ................ 703/1 |
| 2002/0033844 | A1* | 3/2002 | Levy et al. .................. 345/744 |
| 2003/0033275 | A1 | 2/2003 | Alpha et al. |
| 2003/0035397 | A1* | 2/2003 | Haller et al. ................ 370/338 |
| 2003/0037037 | A1 | 2/2003 | Adams et al. |
| 2003/0046289 | A1 | 3/2003 | Balasubramanian et al. |
| 2003/0172145 | A1* | 9/2003 | Nguyen ...................... 709/223 |
| 2004/0073467 | A1* | 4/2004 | Heyns et al. ................... 705/7 |
| 2005/0114367 | A1 | 5/2005 | Serebrennikov |
| 2006/0047636 | A1 | 3/2006 | Mohania et al. |
| 2006/0152755 | A1 | 7/2006 | Curtis et al. |
| 2006/0190443 | A1* | 8/2006 | Mathews et al. ............... 707/3 |
| 2006/0235820 | A1 | 10/2006 | Hoth et al. |
| 2006/0247506 | A1* | 11/2006 | Balberg et al. .............. 600/323 |
| 2006/0253423 | A1 | 11/2006 | McLane et al. |
| 2007/0005573 | A1* | 1/2007 | Murarka et al. ................ 707/3 |
| 2007/0118491 | A1 | 5/2007 | Baum et al. |
| 2007/0156677 | A1 | 7/2007 | Szabo |
| 2007/0162316 | A1* | 7/2007 | Kratschmer et al. ............ 705/8 |
| 2007/0203869 | A1* | 8/2007 | Ramsey et al. ................ 706/52 |
| 2008/0235795 | A1* | 9/2008 | Ishikawa et al. .............. 726/22 |
| 2008/0270361 | A1* | 10/2008 | Meyer et al. ................... 707/3 |
| 2009/0049074 | A1* | 2/2009 | Dara-Abrams et al. ...... 707/102 |

OTHER PUBLICATIONS

"Software as a Service", Wikipedia.org, Oct. 31, 2007, 5 pages.

"LinkedIn", Wikipedia.org, Oct. 31, 2007, 3 pages.

"Facebook", Wikipedia.org, Nov. 12, 2007, 12 pages.

Su, et al. "Indexing Relational Database Content Offline for Efficient Keyword-Based Search", Jul. 2005, 10 pages.

Raghavan, Prabhakar. "Structured and Unstructured Search in Enterprises", Bulletin of the IEEE Computer Society Technical Committee on Data Engineering, 2001, 4 pages.

Zhan, Jiang and Wang, Shan. "ITREKS: Keyword Search over Relational Database by Indexing Tuple Relationship", R. Kotagiri, et al (Eds.); DASFAA, LNCS 4443, pp. 67-78, 2007, 12 pages.

Saracco, Cynthia M. "Query DB2 XML Data with SQL", Mar. 16, 2006, 15 pages.

"mmDB", Oct. 8, 2007, 25 pages.

"MoreMotion Database Features", MorYazilim: The Provider of XML Development Tools, Copyright 2002-2006, 3 pages.

"splunk: The Seven Wonders of IT Search", www.splunk.com, 2007, 8 pages.

"splunk—Print User Manual", 2007, 48 pages.

"splunk—Print Developer Manual", 2007, 35 pages.

"splunk—Print Admin Manual", 2007, 197 pages.

Su, et al. "Indexing Relational Database Content Offline for Efficient Keyword-Based Search", Jul. 2005, 13 pages.

"EPICENTER Concepts and Solutions Guide, Version 6.0," Extreme Networks, Nov. 2006, Part No. 100249-00 Rev. 1, downloaded from http://www.extremenetworks.com/libraries/services/EPICenter60_SolutionsGuide.pdf on Dec. 12, 2008.

International Search Report and Written Opinion, Application No. PCT/US08/81017, dated Dec. 16, 2008.

International Search Report and Written Opinion, Application No. PCT/US08/81019, dated Dec. 29, 2008.

International Search Report and Written Opinion, Application No. PCT/US08/81220, dated Jan. 6, 2009.

* cited by examiner

HOSTED SEARCHING OF PRIVATE LOCAL AREA NETWORK INFORMATION

CROSS-REFERENCE TO RELATED APPLICATIONS

Not Applicable.

BACKGROUND

1. Field

Embodiments of the invention relate to the field of hosted searching; and more specifically, to the hosted searching of private local area network (LAN) information.

2. Background

One method of searching is performed over the World Wide Web (WWW). This type of searching is commonly referred to as web searching and is normally performed by a search engine. The term search engine is used to refer to an information retrieval system designed to help find information stored on a computer system. Search engines help to minimize the time required to find information and the amount of information which is subsequently consulted. One type of conventional search engines are Web search engines that search for information on the public WWW. Other types of conventional search engines may include enterprise search engines that search on private intranets, personal search engines, and mobile search engines. Typically, search engines provide an interface to enable users to specify criteria about an item of interest and have the engine find the matching items within the stored information. The items of interest of interest are typically documents and the criteria are the words or concepts that the document may contain. A document, as used herein, is a bounded physical representation of a body of information designed with the capacity to communicate information. Documents may be digital files in various formats, including web pages, word processing documents, images, or the like.

One prior art technique of Web search engine is to use a Web crawler. A web crawler, also known as a web spider, web robot or web bot, is a program or automated script which browses the WWW in a methodical, automated manner. This process is called web crawling or spidering. Many search engines uses spidering as a means of providing up-to-date data. Web crawlers are mainly used to create a copy of all the visited pages for later processing by the search engine that will index the downloaded pages to provide fast searches. A web crawler typically starts with a list of Uniform Resource Locator (URL), and upon visiting these URLs, the web crawler identifies all hyperlinks in the page and adds them to the list of URLs to visit. These URLs can be recursively visited according to a set of policies. By indexing collected documents, or metadata about the documents, the search engine can provide a set of matching items quickly. For example, a library search engine may determine the author of each book automatically and add the author name to a description of each book. Users can then search for books by the author's name. The metadata collected about each item (e.g., document) is typically stored in the form of an index. The index provides a way for the search engine to calculate the relevance, or similarity, between the search query and the set of items.

A limitation of this prior art method is that the collected information is a copy of the entire document, and the index is organized according to the collected documents, such as by the metadata that corresponds to the document. As a result, this prior art method has the disadvantages of processing the entire collected documents, such as to extract or generate metadata related to the collected documents, and organizing the document information (e.g., metadata) according to documents, not according to the items of interest.

Another prior art technique of a personal search engine is to use a desktop search tool. A desktop search tool is a tool that searches the contents of a user's own computer files, rather than searching other computers, or searching the Internet. These tools are designed to find information about documents on the user's computer, including web browser histories, e-mail archives, text documents, audio files, images, video, or the like. The search index for the desktop search tool resides on the user's computer. The search index is also organized according to the documents, not according to the items of interest.

A limitation of this prior art method is that the desktop search tool only collects information from a user's computer, not other computers. Another limitation of this prior art method is that the desktop search tool only collects information on the user's computer and does not discover other devices from which to collect information. As a result, this prior art method has the disadvantage of being limited in the types of information sources from which to collect information and the types of information that can be collected.

BRIEF SUMMARY

In one embodiment, an apparatus for hosted searching of different private LAN information includes a LAN crawler to automatically and repeatedly crawl a LAN having multiple devices, and a hosted on-demand search system including a set of one or more centralized-search servers. The LAN crawler includes a collection module to attempt to collect, from across multiple disparate information sources stored in the multiple devices, only the parts of the disparate information sources that include descriptive information of a first set of one or more items of interest. The LAN crawler includes a reporting module to automatically report the collected information organized according to the first set of items of interest out of a firewall of the private LAN being crawled and over the Internet. The set of one or more centralized-search servers includes a crawler interface to receive the reports of different instances of the LAN crawler deployed on the multiple private LANs, at least some of which are operated by different entities, and a database interface to create and synchronize a separate private search database for each of the private LANs based on the received reports. Each of the private search databases includes the collected information that is not organized by documents located on the private LANs, by the first set of items of interest. The set of one or more centralized-search servers also includes a server user interface module to provide a user interface over the Internet to each of the private LANs to perform private searches of their corresponding private search database. The set of one or more centralized-search servers also includes a configuration database coupled to the server user interface module to store authentication information for access by the user interfaces and search queries.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
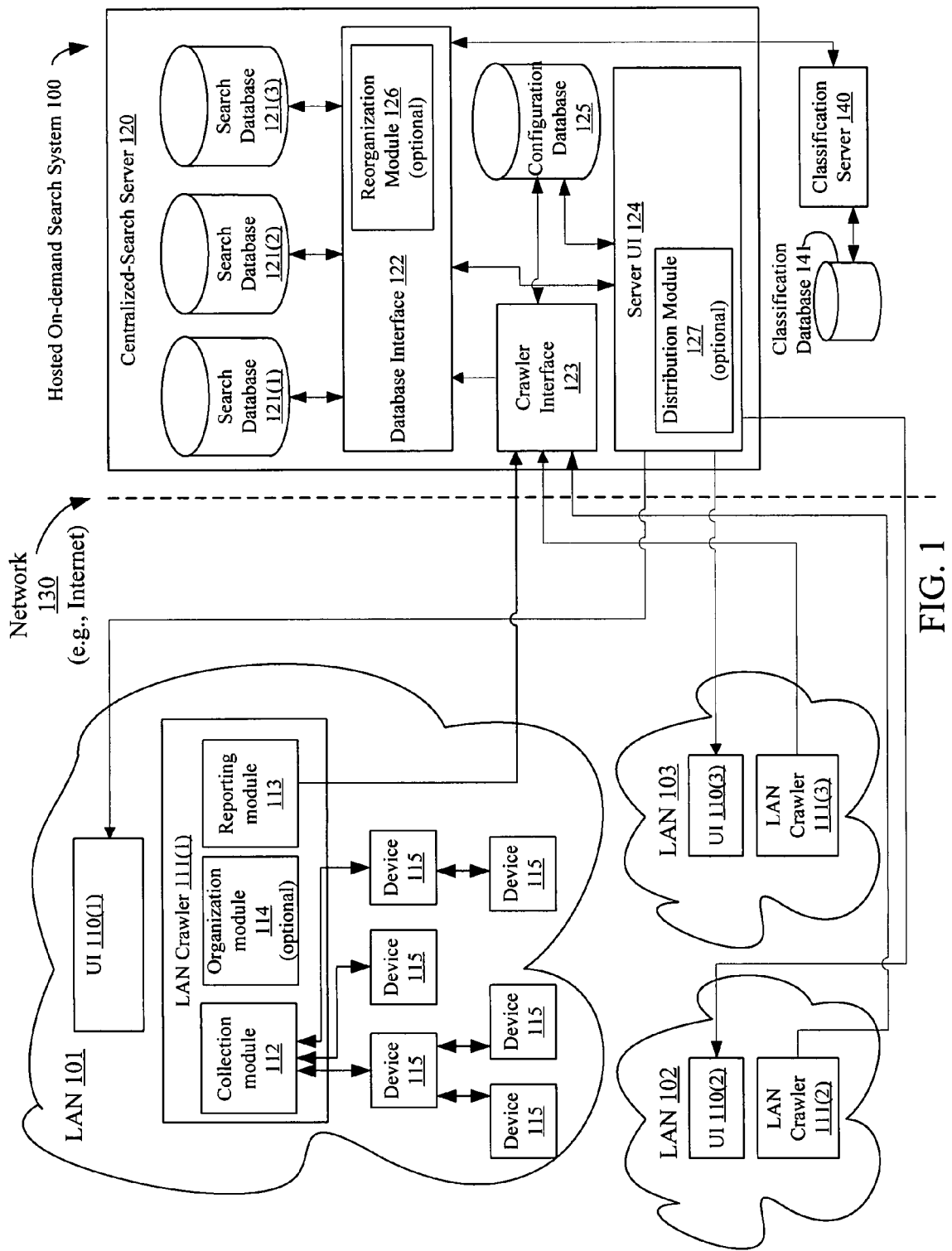
FIG. 1 illustrates an exemplary hosted on-demand search system coupled to multiple private LANs over a network according to one embodiment of the invention.

The following description describes methods and apparatus for hosted searching of different private LAN information. In the following description, numerous specific details such as logic implementations, opcodes, operations, hardware of software modules, code, and types and interrelationships of system components are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

A method and apparatus for hosted searching of different LAN information is described. In one embodiment, an apparatus for hosted searching of different private LAN information includes a LAN crawler to automatically and repeatedly crawl a LAN having multiple devices, and a hosted on-demand search system including a set of one or more centralized-search servers.

In another embodiment, the LAN crawler includes a collection module to attempt to collect, from across multiple disparate information sources stored in the multiple devices, only the parts of the disparate information sources that include descriptive information of a first set of one or more items of interest. In another embodiment, the parts are collected from multiple information sources. In another embodiment, the LAN crawler includes a reporting module to automatically report the collected information organized according to the first set of items of interest out of a firewall of the private LAN being crawled and over the Internet. In another embodiment, the LAN crawler includes an organization module to automatically organize the collected information according to the first set of items of interest.

In another embodiment, the set of one or more centralized-search servers includes a crawler interface to receive the reports of different instances of the LAN crawler deployed on the multiple private LANs, at least some of which are operated by different entities, and a database interface to create and synchronize a separate private search database for each of the private LANs based on the received reports. Each of the private search databases includes the collected information that is not organized by documents located on the private LANs, but by the first set of items of interest. In another embodiment, the set of one or more centralized-search servers also includes a server user interface module to provide a user interface over the Internet to each of the private LANs to perform private searches of their corresponding private search database. In another embodiment, the set of one or more centralized-search servers also includes a configuration database coupled to the server user interface module to store authentication information for access by the user interfaces and search queries.

Hosted On-Demand Search System

FIG. 1 illustrates an exemplary hosted on-demand search system 100 coupled to multiple private LANs 101, 102, and 103 over a network 130 according to one embodiment of the invention. The hosted on-demand search system 100 is coupled to private LANs 101, 102, and 103 over the network 130, for example, the Internet. The private LANs may be owned and operated by different entities, such as different users, organizations, companies, or the like. For example, LAN 101 may be owned by a first company, and the LANs 102 and 103 are owned by a separate company, or alternatively, the LANs 101 may all be owned by separate companies. Each of the private LANs 101, 103, and 103 includes user interfaces (UI) 110(1), 110(2), and 110(3), respectively, and multiple devices 115 (only illustrated in private LAN 101 for ease of illustration). In one embodiment, the user interfaces 110(1), 110(2), and 110(3) are browser-based UIs that allow a user to retrieve the information from the corresponding private search databases 121(1), 121(2), and 121(3), respectively. The private search databases 121(1), 121(2), and 121(3) are data repositories that store the information collected by the LAN crawlers 111(1), 111(2), and 111(3), respectively. Using the user interfaces 110(1), 110(2), and 110(3), users can query the collected information stored in the private search databases 121(1), 121(2), and 121(3), respectively, to get search results. The user interfaces 110(1), 110 (2), and 110(3) can display the search results in tree, chart, list, table, formats, as well as other types of formats.

The multiple devices 115 may include a server, a directory server, a workstation, a network printer, a switch, a router, or other electronic devices that can be part of a private LAN. Also, deployed on the private LANs 101, 102, and 103, are LAN crawlers 111(1), 111(2), 111(3), respectively. A LAN crawler is an automated script which explores the devices 115 of each of the private LANs in a methodical, automated manner. The LAN crawler automatically and repeatedly crawls the devices 115 of the private LAN to collect, from across multiple disparate information sources stored on the devices 115, descriptive information of items of interest. The LAN crawler collects from multiple disparate information sources, only those parts of the disparate information sources that include descriptive information of the first set of items of interest, instead of copying the entire information source. The LAN crawler of each of the private LAN may be deployed on a client device, such as a client workstation. Alternatively, the LAN crawler may be deployed on one of the devices 115 of the private LAN. In one embodiment, the LAN crawler and the UI for each of the private LANs resides on the same client device. Alternatively, the LAN crawler and UI for each of the private LANs may reside on separate devices. It should be noted that the LAN crawler is different from a web crawler (also referred to as a web spider, web robot, or web bot), which is a program or automated script which browses the World Wide Web in a methodical, automated manner in order to create a copy of all the visited pages for later processing by a search engine that indexes the downloaded pages.

Although only illustrated in the LAN crawler 111(1), each of the LAN crawlers 111(1), 111(2), and 111(3) includes a collection module 112 and a reporting module 113. The collection module 112 attempts to collect, from across each of the disparate information sources, the descriptive information of the items of interest. In one embodiment, the descriptive information is collected from a single information source. In another embodiment, the descriptive information is collected from multiple information sources. The reporting module 113 automatically reports the collected information. In one embodiment, the reporting module 113 automatically reports the collected information organized according to the items of interest out of a firewall of the private LAN being called and over the Internet. In one embodiment, the reporting module 113 is configured to send the reports periodically over the Internet. In another embodiment, the reporting module 113 is configured to send the information once collected. Alternatively, the reporting module 113 may be configured to send the report on a scheduled basis. In one embodiment, the reports include corresponding time-stamped data with the collected information to indicate the time at which the information is collected. Alternatively, the reports do not include time-stamped data.

In another embodiment, each of the LAN crawlers also includes an organization module 114. The organization module 114 automatically organizes the collected information according to the items of interest. In one embodiment, the collection module 112 attempts to collect the descriptive information through a set of one or more organize questions to the devices 115 of the private LAN being crawled. In response to the set of one or more organize questions the collection module 112 receives values from the devices 115, including the descriptive information of the items of interest. In one embodiment, the organized questions are request inquiries with defined names that extract values that correspond to the defined names. The defined names and corresponding values are name-value pairs that can be stored in the private search database 121. When the collection module 112 asks the questions in an organized manner, the collected information is implicitly organized for the reports that are sent by the reporting module 113. For example, it may be important to know the different between a computer named "Tetris" and installed software name "Tetris." Because the LAN crawler 111 knows how it collected the information for each item (e.g., using the organized questions), including how to identify the computer which has the name, the network to which that computer belongs, and the identity of the computer which has the software installed, the two items similarly named items can be distinguished by its organization in the collected information. Similarly, the collected information may be stored in the private search database using this organization. In another embodiment, the collection module 112 collects information that is not implicitly organized, and sends the unorganized information to the organization module 114 to be organized for the reports that are sent by the reporting module 113. In either case, the reporting module 113 generates one or more reports to send to the collected information to the hosted on-demand search system 100.

The hosted on-demand search system 100, which is coupled to the network 130 (e.g., Internet), includes a set of one or more centralized-search servers 120 (one centralized-search server has been illustrated. The centralized-search server 120 includes a private search database that corresponds to each of the private LANs. For example, the centralized-search server 120 includes private search databases 121(1), 121(2), and 121(3), which correspond to private LANs 101, 102, and 103, respectively. A search database is a collection of records or data that is stored in a data repository of a computer system so that a computer program or person using a search query language can consult it to answer search queries. The centralized-search server 120 includes a database interface 122 which creates and synchronize the separate private search databases 121(1), 121(2), and 121(3) for each of the private LANs 101, 102, and 103, respectively.

In one embodiment, the database interface 122 is a database management system (DBMS), which is used to manage and query the search database. In one embodiment, the database interface 122 is implemented in code. The central concept of a database is that of a collection of records, or pieces of information. Typically, for a given database, there is a structural description of the type of pieces of information held in that database; this description is known as a schema. The schema describes the objects that are represented in the database, and the relationships among them. There are a number of different ways of organizing a schema, that is, of modeling the database structure; these are known as database models. There are various types of database models, such as, for example, relational models, flat models, hierarchical models, network models, object-relational models, object models, entity-relationship models, associative models, concept-oriented models, entity-attribute-value models, semi-structured models, extensible markup language (XML) database models, or the like. The model in most common use is the relational model, which represents all information in the form of multiple related tables, each including rows, and columns. This model represents relationships by the use of values common to more than one table. Other models such as the hierarchical model and the network model use a more explicit representation of relationships. The hierarchical model is organized into a tree-like structure. The structure allows repeating information using parent/child relationships: each parent can have many children but each child only has one parent. In one embodiment, the private search databases 121(1), 121(2), and 121(3) is a hierarchical database, as described in more detail below. Alternatively, in other embodiments, the private search databases 121(1), 121(2), and 121(3), are other types of databases.

Each of the private search databases 121(1), 121(2), and 121(3) includes the collected information, which is collected from across the disparate information sources of a private LAN being crawled. The collected information in each of the private search databases 121(1), 121(2), and 121(3) is organized according to the items of interest, and not by documents located on the private LANs. It should be noted conventional search engines organize the collected information according to the collected documents, not the items of interest.

The centralized-search server 120 also includes a crawler interface 123 that receives the reports from the reporting module 113 of the different instances of the LAN crawler (e.g., 111(1), 111(2), and 111(3)) deployed on the different private LANs 101, 102, and 103. The crawler interface 123 distinguishes the reports from the different instances of the LAN crawler deployed on the different private LANs to identify in which private search database a particular report is to be stored, and sends the distinguish reports to the database interface 122 to be stored in the identified search database (e.g., search databases 121(1), 121(2), and 121(3)). In one embodiment, the crawler interface 123 distinguishes the reports by sending an identifier of the received report to a configuration database 125, and receives the identified search database that corresponds to the identifier from the configuration database 125. The identifier identifies the entity that operates the particular LAN from which the report was received. The identifiers for each of the private LANs may be inserted into the reports by the respective LAN crawler.

The centralized-search server 120 also includes a server user interface (UI) module 124 that is coupled to the database interface 122, crawler interface 123, and configuration database 125. The server UI module 124 is configured to provide a user interface 110 over the Internet to each of the private LANs 101, 102, and 103, to allow users to perform private searches of their corresponding private search database 121(1), 121(2), and 121(3), respectively. In one embodiment, the server UI module 124 receives a search query from a user of the private LAN 101 to perform a private search of the corresponding private search database 121(1). These servers UI module 124 performs a search in the search database 121(1) through the database interface 122 using the search query. In one embodiment, the server UI module 124 is configured to store the search query in the configuration database 125 for later retrieval by the user. The user may designate the search query as being shareable. When the search query is designated as shareable, the server UI module 124 stores the search query, but not the search results of the private search, and designates the saved search query as shareable, allowing for display and selection of the shareable search query on the user interfaces 110(1), 110(2), and 110(3) of the private LANs 101, 102, and 103, respectively. However, when the search query is not designated as shareable, the server UI module 124 stores a search query and only allows for display and selection of the stored search query on the user interface 110(1) of the private LAN 101 from which the search query originated.

The centralized-search server 120 also includes the configuration database 125 that is coupled to the crawler interface 123 and the server user interface module 124. In addition to storing the search queries as described above, the configuration database 125 may also store authentication information for access by the user interfaces 110(1), 110(2), and 110(3). The configuration database 125 also stores the identifiers to identify the source of the received reports in order to distinguish each of the reports for each of the private LANs from which the reports originated. Table 1 includes exemplary types of information that are stored in the configuration database 125.

TABLE 1

| Type of Information | Description of Information |
| --- | --- |
| Users | User authentication information |
| Companies | Companies which to which the users belong |
| Demographics | Demographic information collected from users |
| Crawlers | Information about crawler operation |
| Dashboards | A dashboard is a collection of dashboard panels each of which display information from saved search queries |
| Saved Search Queries | A search query which has been saved by a user and optionally designated as shareable |
| Search Histories | Search history for each user |

The exemplary types of information of Table 1 include users, demographics, LAN crawlers, dashboards, saved search queries, and search histories. The user-type information may include user authentication information that is used to authenticate the user, such as when the user requests the user interface 110(1) from the server user UI module 124. The demographic-type information may include demographic information collected from each of the users of the private LANs 101, 102, and 103, respectively. The crawler-type information may include information about the crawler operations on the particular LAN crawlers of each of the private LANs 101, 102, and 103. The dashboard-type information includes information regarding a collection of dashboard panels. A dashboard is a graphical user interface (GUI) widget that can be part of the user interface 110(1), and can be configured and saved by the user to display search results in various forms for saved search queries. For example, the user interface 110(1) may include a page that displays various components, as well as the dashboard. Alternatively, the page may include a dashboard that includes one or more dashboard panels. Each of the dashboard panels may include updated search results for separate saved search queries. For example, a user may have separate dashboard panel for displaying search results in the form of a list, a chart, or a table, as described in more detail below. The collection of dashboard panels may include saved configurations of the dashboard on each of the user interfaces 110(1), 110(2), and 110(3). For example, the user may save the configuration of a dashboard with a saved search query so that when the user logs in, the dashboard may be displayed with updated search results for the saved search query without having to manually enter the search query again.

Also, the configuration database 125 may also store other types of information, such as saved search queries and search histories. The saved search query may be saved by a user and optionally designated as shareable to be shared with other users of other private LANs. It should be noted that although a search query is designated as shareable, only the saved search queries are shared, not the search results from the saved search queries. The search history type information includes search histories for each of the users. It should be noted that Table 1 includes exemplary types of information that may be stored in the configuration database 125, but in other embodiments, the database 125 may store other types of information.

In another embodiment, the hosted on-demand search system 100 includes a classification server 140 coupled to a classification database 141. The classification server 140 may attempt to identify devices 115 that are discovered on the private LANs 101, 102, and 103. The classification server 141 is configured to compare the collected information of the private search databases 121(1), 121(2), and 121(3) against predetermined characteristics of own devices stored in the classification database 141, and to compute a classification metric for the multiple devices 115 of the private LAN 101, 102, and 103. For example, the classification server 140 may evaluate the collected information by comparing the collected information against "fingerprints" of known devices stored in the classification database 141, comparing the media access control (MAC) address (of the collected information) to ranges of MAC addresses for known devices stored in the classification database 141, or the like. Then using either the fingerprint comparison or the MAC address lookup, or both, classification server 140 determines a classification for the discovered devices of the private LANs 101, 102, and 103. The classification server 140 can evaluate the collected information and determine a classification for the discovered devices and notify the administrator of the private LAN of the device classification, or modify the collected information in the private search database 121 to include the device classification. By using the classification server 140 and classification database 141, it is possible to collect information from many different networks, and thus a large set of different devices. It is also possible to classify an unknown, discovered device 115 on the private LAN; especially, when the LAN crawler deployed on the private LAN is unable to report certain classification information (e.g., vendor, model, or the like) to the hosted on-demand search server 120. In one embodiment, the classification server 140 and classification database 141 are the classification server and classification database, developed by Network Chemistry of Palo Alto, Calif. The classification server and classification database developed by Network Chemistry may be implemented according to the various embodiments described in U.S. patent application Ser. No. 11/803,004, filed May 10, 2007, entitled "Collaborative Device Classification." Alternatively, the classification server 140 and classification database 141 are other types of classification servers and classification databases. The distribution module 127 is configured to distribute copies of the LAN crawler to be installed on devices. For example, through the user interface, a user visiting a website hosted by the company or organization that manages the hosted on-demand search system 100, may click on a link to download the LAN crawler to the user's computer to be installed and executed.

Figure 2:
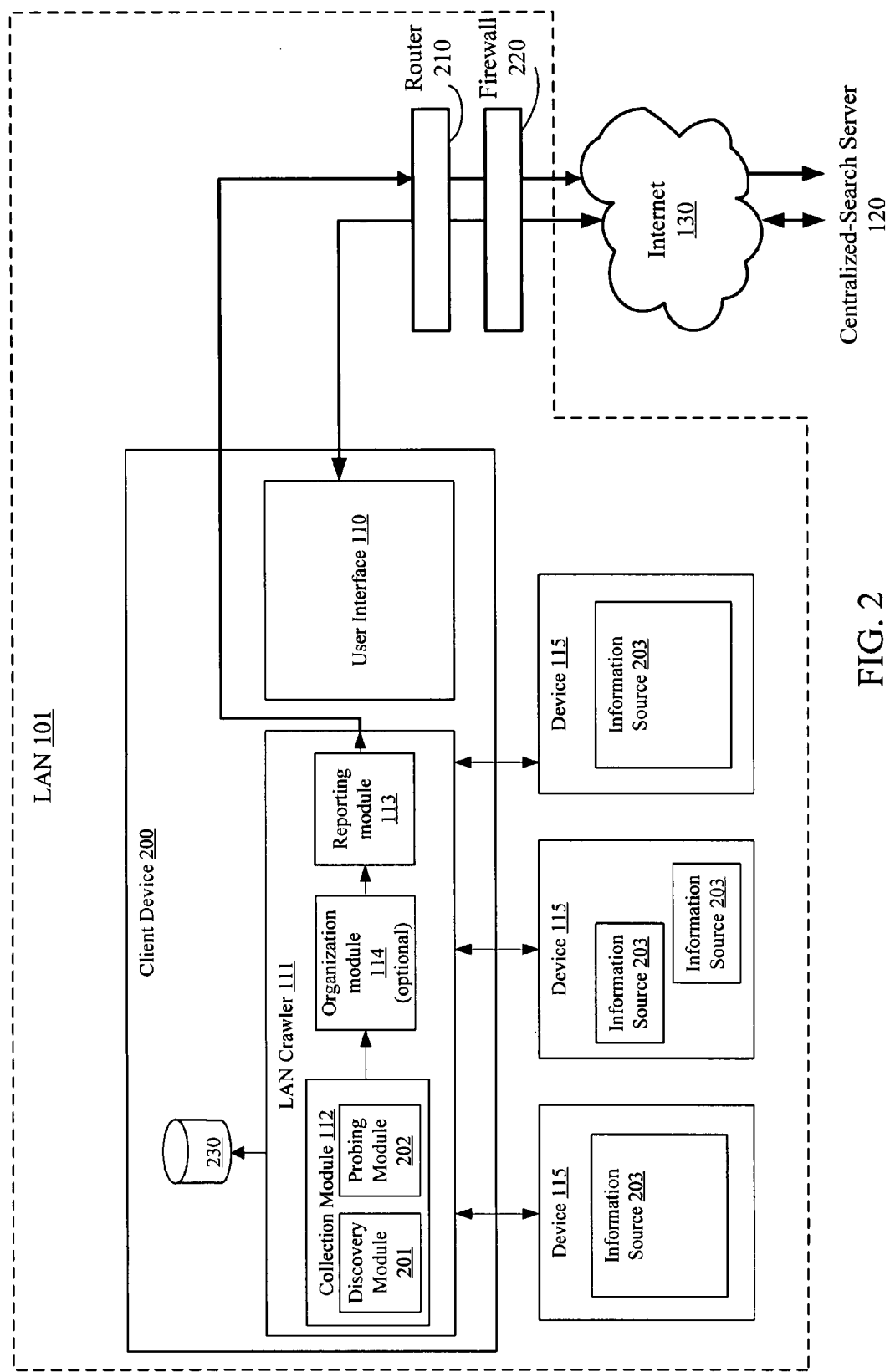
FIG. 2 illustrates an exemplary private LAN having a LAN crawler deployed on a client device according to one embodiment of the invention.

FIG. 2 illustrates an exemplary private LAN 101 having a LAN crawler deployed on a client device 200 according to one embodiment of the invention. The LAN crawler 111 of the client device 200 automatically and repeatedly collects information from multiple devices 115 of the private LAN 101 out of a firewall 220 of the private LAN 101 being crawled and over the Internet 130 to the centralized-search server 120. In particular, the LAN crawler 111 automatically and repeatedly collects information from disparate information sources 203 that are stored on the multiple devices 115. Each of the devices 115 may store one or more information sources 203. As described above, the reporting module 113 automatically records the collected information, which is organized according to the items of interest, out of the firewall 220. In one embodiment, the reporting module 113 communicates with the crawler interface 123 over the Internet through a router 210 and the firewall 220. A router is a computer networking device that interconnects separate logical subnets. A router is a computer whose software and hardware are usually tailored to the tasks of routing and forwarding, generally containing a specialized operating system (e.g. Cisco's IOS or Juniper Networks JunOS or Extreme Networks XOS), RAM, NVRAM, flash memory, and one or more processors. A router may also manage a pool of Internet Protocol (IP) addresses and may have information about client configuration parameters such as the default gateway, the domain name, the Domain name system (DNS) servers, other servers, or the like. A firewall is a hardware or software device which is configured to permit, deny, or proxy data through a computer network which has different levels of trust. Routers and firewalls of private LANs are known to those of ordinary skill in the art, and accordingly, a detailed description regarding routers and firewalls has not been included so as to not obscure the embodiments of the present invention. It should also be noted at the user interface 110 communicates with the server UI module 124 of the centralized-search server 120 over the Internet 130 through the router 210 and firewall 220.

In one embodiment, the collection module 112 of the LAN crawler 111 includes a discovery module 201, and a probing module 202. The discovery module 201 automatically discovers the devices 115 of the private LAN 101 being crawled by the LAN crawler 111. The probing module 202 attempts to collect data on each of the information sources 203 stored in the discovered devices 115 of the private LAN 101. The probing module 202 may be configured to collect data from information sources 203 according to a set of probing requirements. The set of probing requirements may include a set of one or more organized questions. The collection module 112 asks the set of one or more questions of the information sources 203 of the devices 115, and receives values in response to the set of organized questions from the information sources 203. The values include descriptive information regarding the items of interest. In another embodiment, the set of probing requirements may include other types of requests to collect information from the devices 115. As described above, when the collection module asks organized questions, the LAN crawler 111 may not need an organization module to organize the collected information according to the items of interest, since the collected information is implicitly organized by the use of organized questions. Alternatively, the LAN crawler 111 may include an organization module 114 that organizes the collected information according to the items of interest before being reported over the Internet 130 by the reporting module 113.

In one embodiment, the LAN crawler 111 is coupled to a data store 230 (e.g., a memory, a database, or the like) in which the LAN crawler 111 stores configuration information for the particular LAN crawler 111. In one embodiment, the configuration information may include the set of probing requirements for the LAN crawler 111, such as a set of one or more organized questions. Alternatively, the configuration information stored in the data store 230 includes additional LAN crawler configuration information. In another embodiment, the LAN crawler configuration for each of the LAN crawlers is stored in the configuration database 125.

In general, the LAN crawler 111 discovers devices 115 on the private LAN 101 and collects information from the discovered devices 115. The LAN crawler 111 collects, from across multiple disparate information sources 203 stored in the devices 115, only those parts of the disparate information sources 203 that include descriptive information of the first set of items of interest. In one embodiment, for at least one item of interest, the parts are collected from multiple disparate information sources. In one embodiment, the LAN crawler 111 is deployed on the client device 200. For example, the LAN crawler 111 can be software operating on a processor of the client device 200.

In one embodiment, the descriptive information of the first set of items of interest include, in general, technical information regarding the private LANs 101, 102, and 103, user of the private LANs 101, 102, and 103, and the multiple devices 115 of each of the private LANs 101, 102, and 103. Each of the LAN crawlers 111(1), 111(2), and 111(3), is configured to collect values of the technical information from the multiple information sources 203 stored on the devices 115 through a set of one or more organized questions to the devices 115 of the private LAN being crawled.

Information Technology (IT) or Information and Communications Technology (ICT), as defined by the Information Technology Association of America (ITAA), is the study, design, development, implementation, and support or management of computer-based information system, particularly software applications and computer hardware. IT deals with the use of electronic computers and computer software to convert, store, protect, process, transmit, and retrieve information, securely. IT professionals, such as network administrators, perform a variety of duties that range from installing applications to designing complex computer networks and information databases, such as data management, networking, engineering computer hardware, database and software design, as well and the management and administration of entire systems or networks. In one embodiment, the technical information is IT information that is used by an IT professional in performing a variety of duties, such as those described above, for the study, design, development, implementation, and support or management of computer-based information systems, particularly software applications and computer hardware. Some examples of descriptive IT information include, but are not limited to, information in configuration files in routers, switches, firewalls, asset lists, information in Lightweight Directory Access Protocol (LDAP) servers (described below), personal computer configuration information in a registry, a Windows Management Instrumentation (WMI) database (described below), and/or a directory, physical and logical network topology information, flow information, raw packet contents, log information from all devices, networks, and systems. Alternatively, the descriptive information of the first set of items of interest may include other types of information other than technical information, such as financial information, enterprise information, or the like.

Network and host security solutions and network management applications are specialized repositories of information that operate independently and without information sharing. More advanced technology leads to more specialization, which makes it even more difficult to share information between systems or devices. Attempts to integrate this information, such as security information managers (SIM), or configuration management databases (CMDB), lead to even more specialization as they limit the resolution of information that they will receive and process—e.g., only receiving alerts from support intrusion detection systems (IDSs), which detects unwanted manipulations to systems, or only parsing configuration from supported routers. The embodiments described herein may allow a user to more easily find technical information, such as network management information and relationships within and between disparate systems or devices, which may help the user to solve network management and security problems. The embodiments described herein may also allow a user to find related items of interest, even when the items of interest originate from disparate information sources, such as devices employing different data models. A data model is an abstract model that describes how data is represented and used.

More specifically, in other embodiments, the technical information may include information regarding existence of the devices 115 within each of the private LANs 101, 102, and 103. The devices 115 may include one or more routers, one or more switches, one or more servers, one or more directory servers, one or more workstations, or the like. The technical information may also include information regarding existence of multiple hardware modules within each of the devices 115, states of the hardware modules, properties of the hardware modules, configuration of the hardware modules, history of the hardware modules. The technical information may also include information regarding existence of any peripherals coupled with the devices 115, states of the peripherals, properties of the peripherals, configuration of the peripherals, history of the peripherals. The technical information may also include information regarding existence of at least one operating system operating within each of the devices 115, state of the operating systems, properties of the operating systems, configuration of the operating systems, history of the operating systems. The technical information may also include information regarding existence of software within each of the devices 115, state of the software, properties of the software, configuration of the software, history of the software. The technical information may also include information regarding presence of users using each of the devices 115, an inventory of users that are authorized to use each of the devices 115, policies assigned to the users for each of the devices 115, and history of each user's actions regarding each of the devices 115.

For example in one embodiment of the invention the data stored in the private search database includes information regarding substantially all devices within a private LAN, a list of software installed on those devices, and a list of users authorized to use those devices. Additionally, the data stored may include information regarding the operating system version installed on substantially all devices within the private LAN, the software which is running on substantially all devices within the private LAN, and a configuration file from at least one router, switch, or firewall within the private LAN. The devices may include substantially all workstations within a private LAN, substantially all routers within the private LAN, substantially all switches within the private LAN, substantially all servers within the private LAN, substantially all firewalls within the private LAN, and substantially all directory servers within the private LAN.

The disparate information sources 203 may include, for example, a routing table of a router, a router configuration file of a router, an ARP table of a switch, a bridging table of a switch, a switch configuration table of a switch, a software configuration file of a server, a resource utilization counter of a server, a log file of a server, custom application file of a server, user information of a directory server, group information of a directory server, a software configuration file of a workstation, a registry of a workstation, an operating system interface database of a workstation, a directory of a workstation, a resource utilization counter of a workstation, a log file of a workstation, a configuration file of a network printer, or the like. Alternatively, other technical information may be collected from other types of information sources than those listed above.

In another embodiment, the technical information is collected from the registry of a device running the WINDOWS® operating system, available from Microsoft®. In another embodiment, the technical information is collected from a WMI database of a device running Microsoft WINDOWS. In another embodiment, the technical information is collected from the "/proc directory" of a device running a UNIX-like operating system (e.g., Linux). In another embodiment, the technical information is collected from a directory service (e.g., residing on a directory server) using LDAP. LDAP is an application protocol for querying and modifying directory services, running over Transmission Control Protocol and Internet Protocol (TCP/IP). LDAP tends to use DNS names for structuring the objects of the directory service. In another embodiment, the technical information is collected from a networking device, for example, a router or a switch, using the Simple Network Management Protocol (SNMP), Telnet, Secure Shell (SSH) protocols, or the like. In another embodiment, the technical information is collected from a network printer using SNMP or the like. Alternatively, the technical information may be collected from other devices that are part of the private LAN.

In one embodiment, the technical information is collected by the LAN crawler 111 asking a set of one or more organized questions of the disparate information sources 203, described above, which are stored in the devices 115 of the private LAN being crawled. In response to the set of organized questions, the LAN crawler 111 receives values of the technical information from the disparate information sources stored on the devices 115.

There are several techniques that may be employed to discover the devices 115 on the private LAN. These techniques fall generally into two main categories: passive traffic collection, and active scanning.

Passive traffic collection entails operating in a promiscuous mode in order to observe all broadcast and non-broadcast network traffic, such as Ethernet traffic. In this technique, device MAC addresses are gathered and the source IP address is recorded if the packet in question is an IP or address resolution protocol (ARP) packet. For active scanning the following techniques can be used: 1) ARP Scanning, 2) Ping Scanning, and 3) CAM Table Scanning.

In ARP Scanning, the local network segment is probed by issuing ARP requests to each possible IP address within the system's broadcast domain. The upper and lower bounds for the addresses to query are determined by examining the network and broadcast addresses of the network adapter used by the LAN crawler 111 to perform the scanning activity. If an ARP reply is received, then a device at the queried IP address exists.

Ping Scanning involves sending an Internet Control Message Protocol (ICMP) echo request (a Ping packet) to a single IP address or a range of addresses. If a device is utilizing one of the IP addresses to which a Ping was sent, the device responds with an ICMP echo reply packet. Thus it can be determined if a device 115 exists at an arbitrary IP address.

Cam Table Scanning involves interrogating the network's switching infrastructure for the MAC addresses of the devices connected to it. This may be done via SNMP. This enables the LAN crawler 111 to quickly gather MAC addresses for all devices 115 on the private LAN without the need for the LAN crawler 111 to be on the same network segment. As described above, the classification server 140 is configured to classify the devices 115. For example, the organizationally unique identifiers (OUIs) which form the first 24-bits of the MAC address can be compared against those that belong to a particular manufacture. For example, the OUI of the MAC address can be compared with those that belong to a manufacture of wireless or wired access points (APs).

Some other techniques that can be used to collect information about the devices 115 of the private LAN are, for example:
1) Passive operating system detection: A device's operating system can be determined remotely by observing key fields in the TCP/IP packets that it emits.
2) TCP & UDP port scanning: APs often run at least a handful of remotely accessible services. By cataloging the services found on a particular model of AP it is possible to determine what devices appear similar to it.
3) IP protocol scanning: Even if a different revision of an AP model uses the same operating system it may support different IP protocols.
4) Service interrogation: Many APs provide services used to configure them. This technique involves interrogating the services an AP may be running in order to gather information that may differentiate it from another device.
5) SNMP queries: Some APs provide SNMP management capabilities. SNMP queries are used to glean any information that may uniquely identify a device.
6) Promiscuous mode detection: If the device is in promiscuous mode then it may be a network bridge. APs may be network bridges.
7) NAT (Network Address Translation) device detection: If the device is performing NAT, then it may be an AP/router. Wireless AP/routers act as NAT gateways for the hosts connected to them.
8) Dynamic Host Configuration Protocol (DHCP) Client Identification: This identifies default hostnames and options that are unique to the DHCP client implementations used in off-the-shelf wireless AP/routers.

Additionally, the device's manufacturer may be determined by the OUI of its MAC address. This information is gathered during normal network communication with the device 115.

In one embodiment, the LAN crawler 111 is configured to collect the same information as described in the U.S. patent application Ser. No. 11/803,004, filed May 11, 2006, entitled "Collaborative Device Classification." In another embodiment, the LAN crawler 111 is configured to collect the same, similar, and/or dissimilar information than the information described in the U.S. patent application Ser. No. 11/803,004. For example, in addition to, or in place of, the information collected by the scan agent, the LAN crawler 111 is configured to attempt to collect information from other types of information sources, such as a WMI database.

A WMI database is a type of operating system interface database. WMI specifically is a set of extension to the WINDOWS Driver Model that provides an operating system interface through which instrumented components provide information and notification. WMI allows scripting languages like VBScript or WINDOWS POWERSHELL®, available from Microsoft, to manage personal computers and servers that are running WINDOWS, both locally and remotely. The contents of the WMI database may include make and model information for the hardware of the device, hardware configuration of the device, technical support ID information, list of installed programs, information about logged in users, information about running programs, and/or resource utilization information (e.g., CPU, memory, and disk utilization).

In addition to collecting information from a WMI database, the LAN crawler 111 is configured to collect information from other operating system interface databases, such as Web-Based Enterprise Management (WBEM) and Common Information Model (CIM) standards, available from the Distributed Management Task Force (DMTF).

Figure 3:
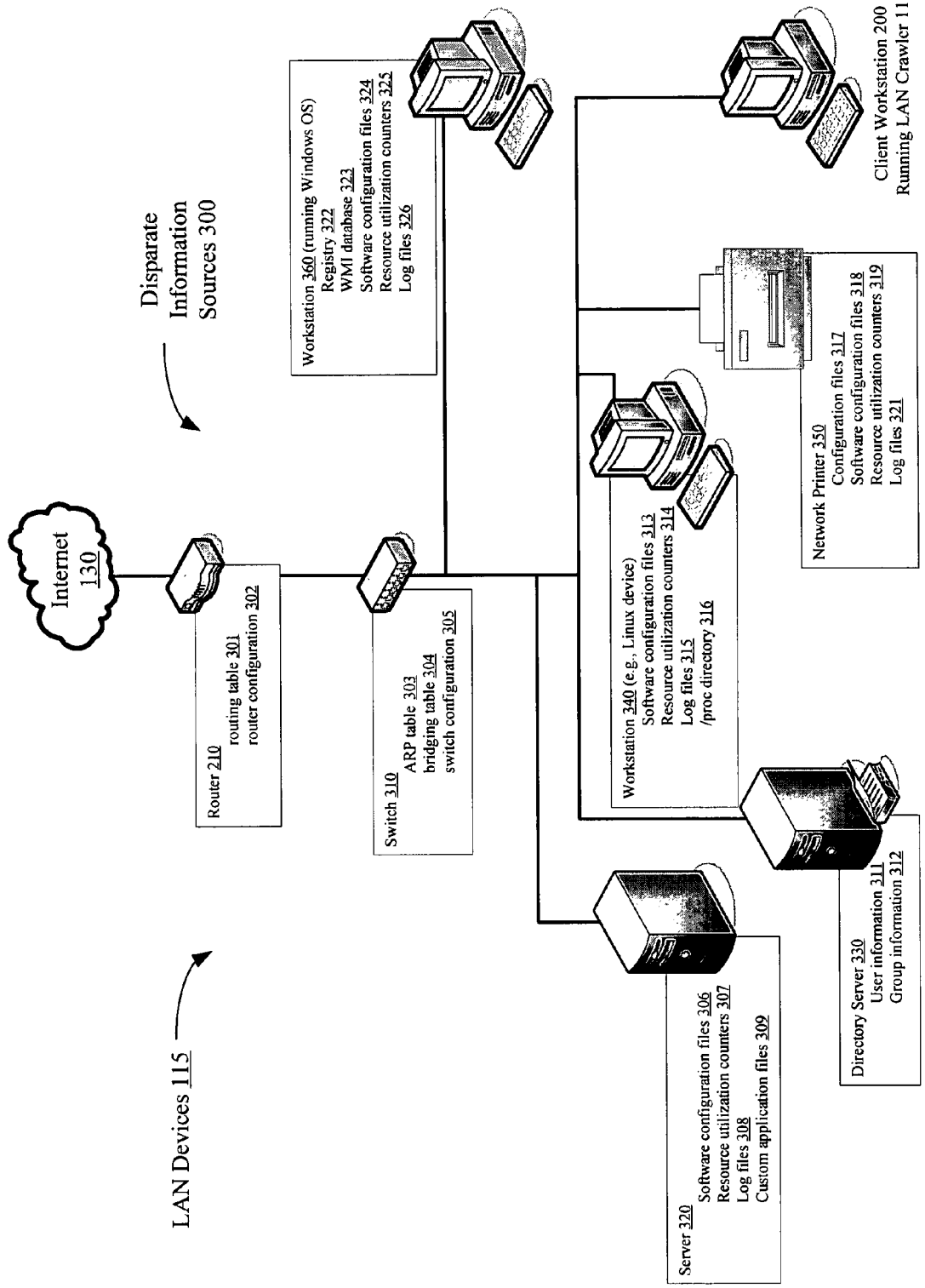
FIG. 3 illustrates exemplary information sources stored on the multiple devices of the private LAN according to one embodiment of the invention.

FIG. 3 illustrates exemplary information sources 300 stored on the multiple devices 115 of the private LAN according to one embodiment of the invention. The multiple private LAN devices 115 include the client device 200 that is running the instance of the LAN crawler 111 (e.g., workstation), the router 210, a switch 310, a server 320, a directory server 330, a first workstation 340, a network printer 350, and a second workstation 360. The information sources 300 are disparate information sources (e.g., 301-326) that are stored on the LAN devices 115. In this embodiment, the router 210 includes a routing table 301 and a routing configuration 302. The routing table 301, also referred to as a Routing Information Base (RIB), is an electronic table (e.g., stored in a file) or database type object that is stored in the router 210. The routing table 301 stores the routes (and in some cases, metrics associated with those routes) to particular network destinations. The routing table 301 may also include information regarding the topology of the private LAN. The routing configuration 302 is an electronic table (e.g., stored in a file) or database type object that is stored in the router 210. The routing configuration 302 may include router configuration information, such as how to automate assignment of IP addresses, subnet masks, default gateway, and other IP parameters, such as firewall rules, or the like. It should be noted that the format of the routing configuration 302 depends on the manufacturer of the router 210. For example, in a router developed by Cisco Systems Inc., the routing configuration 302 is expressed as a series of commands; a new router can be set up with the same configuration by entering the series of commands into a command line interface of the new router. As such, the routing configuration 302 in the Cisco Systems' router may be more like a file. In other embodiments, the routing configuration 302 is available through SNMP. In these embodiments, the routing configuration 302 is stored more like a database.

In one embodiment, the LAN crawler 111 collects descriptive information from the router 210 using SNMP. Alternatively, the LAN crawler 111 may collect the descriptive information from the router 210 using other protocols, such as Telnet, SSH protocols, or the like.

In this embodiment, the switch 310 includes an Address Resolution Protocol (ARP) table 303, a bridging table 304, and switch configuration 305. A switch, also referred to as a network switch, is a computer networking device that connects network segments. Network switches are capable of inspecting data packets as they are received, determining the source and destination device of that packet, and appropriately forwarding the packet to the intended connected device. Switches of private LANs are known to those of ordinary skill in the art, and accordingly, a detailed description regarding switches has not been included so as to not obscure the embodiments of the present invention. The ARP table 303 is a table used for finding a host's hardware address when only the host's network layer address is known. ARP is a standard method for resolving many different network-layer protocol addresses to hardware addresses, and may be used to translate IP addresses to MAC addresses. The ARP table 303 may also include information regarding Token Rings, Fiber Distribution Date Interface (FDDI), IEEE 802.11, IP over ATM, or the like. The switch configuration 305 may store other configuration information related to the switch 310.

In one embodiment, the LAN crawler 111 collects descriptive information from the switch 310 using SNMP. Alternatively, the LAN crawler 111 may collect the descriptive information from the switch 310 using other protocols, such as Telnet, Secure Shell (SSH) protocols, or the like.

In this embodiment, the server 320 includes various disparate information sources, such as software configuration files 306, resource utilization counters 307, log files 308, and custom application files 309. The software configuration files 306 may include information regarding the software that is installed and/or running on server 320, for example, the type and version of the operating system, and/or the types and versions of other types of software. It should be noted that the software configuration information may be stored in other information sources than software configuration files.

The resource utilization counters 307 may include the actual resource utilization values of the server 320. The resource utilization may include, for example, central processing unit (CPU) performance of one or more processors, input-output (I/O) performance, memory performance, or the like. The resource utilization counters 307 may be hardware performance counters (also referred to as hardware counters), which are a set of special-purpose registers of a processor to store the counts of hardware-related activities within the computer system. Alternatively, the resource utilization counters 307 may be software performance counters that read the values from set of special-purpose registers of the processor. Alternatively, the resource utilization values may be stored in log files, WMI database, or in other types of files stored on the sever 320.

The log files 308 may include time-based log information of the server 320. The time-based log information may be sequentially or chronologically recorded in the log files 308. The log files 308 may include recorded events to provide an audit trail that can be used to diagnose problems. For example, some operating systems provide a "syslog" service, which allows the filtering and recording of log message to be performed by a separate dedicated subsystem, rather than each application recording log message. "Syslog" is a standard for forwarding log message in an IP network. The "syslog" service can be used to integrate log data from many different types of systems into a central repository.

The custom application files 309 may include information regarding applications that are currently installed and/or running on the server 320. In one embodiment, custom applications can be developed for exclusive use by the server 320. The custom application file 309 may include information that is specific to custom applications. For example, a Manufacturing Resource Planning (MRP) application may provide the number of transactions per section it is processing through an application interface (API). The LAN crawler 111 could collect specific information, such as transactions per second, from the MRP application through an API.

In one embodiment, the LAN crawler 111 collects descriptive information from the server 320 using Hypertext transfer protocol (HTTP). Alternatively, the LAN crawler 111 may collect the descriptive information from the server 320 using other protocols, such as Representational State Transfer (REST), Remote Procedure Call (RPC), Simple Object Access Protocol (SOAP), SNMP, SSH, WMI, COBRA, Distributed Component Object Model (DCOM), or the like.

In this embodiment, the directory server 330 is an information source that includes user information 311 and/or group information 312. The directory server 330 may be a device that executes one or more software applications that store and organize information about users, groups of users, and/or network resources. The directory server 330 may be used by a network administrator to manage users' access to the resources. The directory server 330 may also store a directory database that holds information about names to objects that are managed in the directory service. The directory server 303 may store such information as, for example, names of users, names of groups of users, permission sets associated with the users, permission sets associated with the groups of users, or the like. The directory service may be a shared information infrastructure for locating, managing, administrating, and organizing common items and network resources, which can include volumes, folders, files, printers, users, groups, devices, telephone numbers, and other objects. For example, the directory service may be used to obtain a list of available computers and the information for accessing them. The directory server 303 may also define the namespace for the network. A namespace a namespace in this context is the term that is used to hold one or more objects as named entries. The directory service has a set of rules that determine how network resources are named and identified. The rules specify that the names be unique and unambiguous. The name is called the distinguished name (DN) and is used to refer to a collection of attributes, such as relative distinguished names, which make up the name of a directory entry.

In one embodiment, the LAN crawler 111 collects descriptive information from the directory service on the directory server 330 using LDAP. Alternatively, the LAN crawler 111 collects descriptive information from the directory server 330 using other protocols, such as protocols used in Active Directory, Remote Authentication Dial In User Service (RADIUS), or the like. Active Directory is an implementation of directory services for use with devices running WINDOWS operating system. Active Directory may provide central authentication and authorization services for WINDOW-based computers, and may allow administrators to assign policies, deploy software, and apply updates to an organization. Active Directory stores information and settings in a central database. The RADIUS protocol is an authentication, authorization, and accounting protocol for applications such as network access or IP mobility.

In this embodiment, the first workstation 340 includes various information sources, such as software configuration files 313, resource utilization counters 314, log files 315, directories 316 (e.g., "/proc directory) of the first workstation 340. The first workstation 340 is a device that is running a UNIX or UNIX-like operating system, such as Linux. A UNIX-like operating system is one that behaves in a manner similar to a UNIX system, while not necessarily conforming to or being certified to any version of the Single UNIX specification. The software configuration files 313 may include information regarding the software that is installed and/or running on first workstation 340, for example, the type and version of the operating system (e.g., Linux), and/or the types and versions of other types of software, as described above with respect to the software configuration files 306. The resource utilization counters 314 may include the actual resource utilization values of the first workstation 340, as described above with respect to the resource utilization counters 307. The log files 315 may include time-based log information of the first workstation 340, as described above with respect to the log files 308.

The directories 316 may include, for example, the "/proc directory." The "/proc directory" is a file or a directory of files containing information about all the CPUs and memories in the system, such as the numbers used to identify each logical CPU, the vender identifications used to identify the CPU manufacturer, the numbers given to identify the CPU family or manufacturing process, information about the current state of the system's computer memory (including virtual memory and the cache), or the like. On workstations that are running Linux, the "/proc directory" may substitute or compliment information contained in the resource utilization counters 314.

In one embodiment, the LAN crawler 111 collects descriptive information from the first workstation 340 using SSH. Alternatively, the LAN crawler 111 may collect the descriptive information from the first workstation 340 using other protocols, such as telnet, SNMP, syslog, HTTP, or the like.

In this embodiment, the network printer 350 includes various information sources, such as a configuration file 317, software configuration files 318, resource utilization counters 319, log files 321, or the like. The software configuration files 318, resource utilization counters 319, log files 321 are similar to those described above with respect to the server 320 and first workstation 340. The configuration file 317 includes information about the network printer, such as the name of the network printer 350, the IP address of the network printer 350, configuration settings of the network printer 350, or the like.

In one embodiment, the LAN crawler 111 collects descriptive information from the network printer 350 using SNMP. Alternatively, the LAN crawler 111 may collect the descriptive information from the network printer 350 using other protocols, such as HTTP, Telnet, or the like.

In this embodiment, the second workstation 360 includes various information sources, including registry 322, WMI database 323, software configuration files 324, resource utilization counters 325, and log files 326. Registry 322 is a directory which stores setting and options for the operating system. The registry 322 may contain information and settings for all the hardware, operating system software, most non-operating system software, users, preferences of the device (e.g., personal computer (PC)), or the like. For example, registry 322 is the Microsoft Registry for the WINDOWS operating system. Whenever a user makes changes to settings, file associations, system policies, or installed software, the changes are reflected and stored in the registry 322. The registry 322 also provides a window into the operation of the kernel, exposing runtime information such as performance counters and currently active hardware. In another embodiment, the information that is obtained from the registry may also be obtained from other non-Windows mechanisms, such as Sysfs and procfs, which expose runtime information through the file system.

As described above, the WMI database 323 is a type of operating system interface database. The contents of the WMI database 323 may include make and model information for the hardware of the device, hardware configuration of the device, technical support ID information, list of installed programs, information about logged in users, information about running programs, and/or resource utilization information (e.g., CPU, memory, and disk utilization).

In another embodiment, the WMI database 323 may be other operating system interface databases, such as Web-Based Enterprise Management (WBEM) and Common Information Model (CIM) standards, from the Distributed Management Task Force (DMTF), or the like.

The software configuration files 324 may include information regarding the software that is installed and/or running on second workstation 360, for example, the type and version of the operating system (e.g., WINDOWS), and/or the types and versions of other types of software, as described above with respect to the software configuration files 306. The resource utilization counters 325 may include the actual resource utilization values of the second workstation 360, as described above with respect to the resource utilization counters 307.

The log files 326 may include time-based log information of the second workstation 360, as described above with respect to the log files 308.

In one embodiment, the LAN crawler 111 collects descriptive information from the second workstation 360 using WMI. Alternatively, the LAN crawler 111 may collect the descriptive information from the second workstation 360 using other protocols, such as server message block (SMB), DCOM, SNMP, or the like.

TABLE 2 includes exemplary information sources, and the corresponding first set of items of interest.

TABLE 2

| Information Sources: | First set of items of Interest: |
|---|---|
| For each Private LAN | List of all device connected to a network |
| For each network device information like: | IP address |
| | MAC Address |
| | Open TCP and UDP ports |
| | Responses to probes on TCP and User Datagram Protocol (UDP) ports |
| | Dynamic Host Configuration Protocol (DHCP) request contents |
| | Domain Name System (DNS) names of the devices |
| For each devices running Microsoft Windows operating system, collected information like: | List of installed programs (content of the Window registry) |
| | Installed program configuration (content of the Window's registry) |
| | Operating System Configuration (content of the Window's registry) |
| | Names of users who have logged into the device (content of the Window's registry) |
| | Invalid Configurations which might have been created by spyware, adware or malicious programs (content of the Window's registry) |
| | Hardware Configuration of the device (content from Windows Management Instrumentation (WMI)) |
| | Make and model information for the hardware (content from WMI) |
| | Technical support ID information (content from WMI) |
| | List of installed programs (content from WMI) |
| | Information about logged in users (content from WMI) |
| | Information about running programs (content from WMI) |
| | Resource utilization information including, e.g., CPU, memory, and disk utilization (content from WMI) |
| | Resource utilization information including, e.g., CPU, memory, and disk utilization (from performance counters) |
| For each devices running Unix-like operating system, collected information like: | Resource utilization information including, e.g., CPU, memory, and disk utilization (e.g., content from/proc directory, performance counters, etc) |
| | List of installed programs |
| | Installed program configuration |
| | Information about logged in users |
| | Information about running programs |
| For each devices supporting SNMP (e.g., switches and routers), collected information like: | Interface utilization statistics |
| | ARP tables |
| | Bridging Tables |
| | Routing Tables |
| | Other information contained in SNMP Management Information Bases (MIBs) |
| For each devices supporting telnet or SSH interfaces with command line interfaces (e.g., Cisco IOS based devices), collected information like: | Detailed device configuration files |
| | Bridging tables |
| | Routing tables |
| For each directory server (e.g., devices using protocols such as LDAP or Active Directory), collected information like: | List of users and groups in the network |
| | Contact information for users |
| | Group membership information for users |
| | Login history information for users |
| | List of other resources in network, such as servers and databases |

TABLE 2-continued

| Information Sources: | First set of items of Interest: |
| --- | --- |
| For each device, log information, saved to log files or forwarded using syslog, like: | User login history<br>Firewall log information<br>Mail server history<br>Application error logs |
| For each web server, collected information like: | The number of hits to the website<br>Number of sales, click-through rate, or other sales metrics |
| For each device, collected information from other internal systems (e.g., Customer Relationship Management (CRM) Systems), like: | Number of meetings scheduled<br>Pipeline value |
| For each application on a device, collected information like: | Up-time of the application<br>Number of transactions processed<br>Number of active connections<br>Average transaction time |

Figure 4:
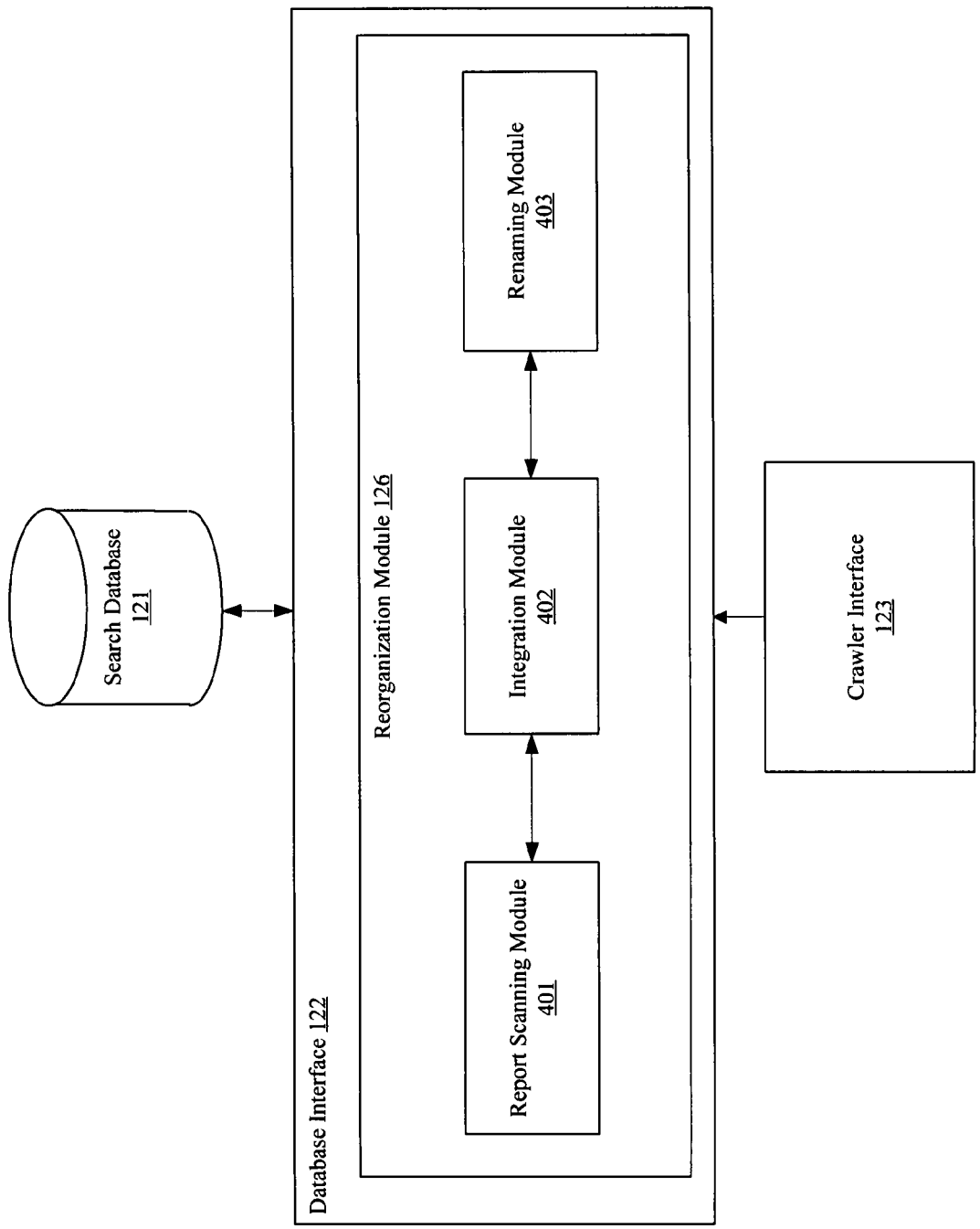
FIG. 4 illustrates an exemplary reorganization module of the centralized-search server according to one embodiment of the invention.

FIG. 4 illustrates an exemplary reorganization module 126 of the centralized-search server 120 according to one embodiment of the invention. In this embodiment, the database interface 122 includes the reorganization module 126. The reorganization module 126 is configured to reorganize the collected information by adding items of interest to the collected information stored in the corresponding search database 121, to reorganize the existing items of interest stored in the corresponding search database 121, to rename existing items of interests stored in the corresponding search database 121, or the like. In one embodiment, the reorganization module 126 is part of the database interface 122. Alternatively, the reorganization module 126 may be implemented in a separate module, or in other modules of the hosted on-demand search system 100.

The reorganization module 126 includes a report scanning module 401, an integration module 402, and a renaming module 403. The report scanning module 401 is configured to attempt to collect, from across the disparate reports received from the private LAN being crawled, descriptive information of other items of interest (also referred to as second set of one or more items of interest). The integration module 402 is configured to integrate the collected descriptive information that is organized according to the second set of items of interest into the corresponding private search database 121. The integration module 402 can extract descriptive information of the second set of items of interest from the reports that include the descriptive information of the first set of items of interest, and integrate the extracted information into the private search database 121 to be organized according to the second set of items of interest in addition to, or in place of, the descriptive information that is organized according to the first set of items of interest when received from the crawler interface 123. For example, TABLE 3 includes exemplary second set of items of interest that can be created from the first set of items of interest received in the reports from the LAN crawlers.

TABLE 3

| Second Set of Items of Interest | Description of How Created |
| --- | --- |
| Network topology information | Interconnection of devices 115 on the private LAN deduced from the information in routing and bridging information collected by the LAN crawler 111 |
| Estimated device vendor and model for devices which do not report this information | Device vendor and model for devices 115 deduced from classification server 140 |
| Security Audit | Information reported by the LAN crawler 111 is analyzed for security of configuration and for security incidents and the security posture of the private LAN is summarized in a report |
| Software License Audit | Information about installation applications is summarized so it can be compared with the number of licenses owned for each software application |
| Threshold Alerting | Resource utilization information, such as disk usage, is compared with thresholds and if the thresholds are exceeded then the user is notified |

In other embodiments, other types of second set of items of interest can be created from the first set of items of interest received in the reports from the LAN crawlers.

In another embodiment, the report scanning module 401 and the integration module 402 are used to reorganize the collected information according to a different organization, such as organized according to the created items of interest that are derived from the first set of items of interest.

The renaming module 403 is configured to rename similar items having different terminology to have a common terminology for searching purposes. The report scanning module 401 attempts to identify from among the first set of items of interest, received in the reports, similar items having different terminology. The renaming module 403 renames the similar items to have the common terminology. The integration module 402 integrates the collected information of the reports and the renamed similar items into the corresponding search database 121. For example, a workstation running WINDOWS may include a "network adapter" to communicate with other devices 115, while a workstation running Linux may include a "network interface" to communicate with other devices. When searching the private search database 121, a user may provide a search query for all "network interfaces" of the private LAN to be displayed to show the available network interfaces or network adapters that communicate with other devices. Without reorganizing the collected information using the renaming module 403, the search results may not include the "network adapters," even though the user intended the search query to include the "network adapters." The renaming module 403 can rename the collected "network adapter" information to be named as "network interfaces," or vice versa. Also, in other embodiments, the renaming module 403 does not replace the name of the collected information, but adds additional information to the collected information. So for the example above, the "network interface" and "network interface" objects can be modified to include both values as "network interface" and "network interface." Alternatively, the renaming module 403 may rename the collected information to include a class identifier that identifies, for example, both "network interface" and "network interface." Alternatively, the report scanning module 401, integration module 402, and renaming module 403 may be used to otherwise reorganize the collected information to be separately stored in the private search database 121, or in place of the collected information in the private search database 121.

In another embodiment, the report scanning module 401, the integration module 402, and renaming module 403 are used to reorganize the collected information as described above, such as according to the first set of items of interests and/or according to the second set of items of interest; however, the reorganized information of this embodiment may include common terminology for similar items of the disparate information sources 203 having different terminologies.

In one embodiment, in order to create network topology information, information is collected from bridging tables from switches of the private LAN 101. For example, the LAN crawler 111 is configured to access the bridging table 304 of the switch 310, illustrated in FIG. 3. The LAN crawler 111 can access the bridging table 304 using SNMP, SSH protocol, or the like. In addition, the LAN crawler 111 can access information from the routing tables of the routers of the private LAN, for example, from the routing table 310 of router 201, illustrated in FIG. 3. Using the information from the bridging tables and/or routing tables, information about the network topology can be created and integrated into the collected information stored in the private search database 121. The network topology information may be separately stored in the private search database 121 for later retrieval by the user when the user wishes to analyze the network topology of the private LAN. In addition to obtaining the information from the bridging and routing tables, in another embodiment, device names may be retrieved form the DNS server using reverse DNS lookups using the IP addresses. As such, the IP addresses can be linked to the device names. The device names may also be stored in addition to, or in place of, the previously collected information stored in the private search database 121. In another embodiment, information regarding the device types can be obtained, for example, by receiving responses to probes to open ports. Alternatively, other types of information may be collected to create the network topology information.

The operations of this and other flow diagrams will be described with reference to the exemplary embodiments of the other diagrams. However, it should be understood that the operations of the flow diagrams can be performed by embodiments of the invention other than those discussed with reference to these other diagrams, and the embodiments of the invention discussed with reference these other diagrams can perform operations different than those discussed with reference to the flow diagrams.

The techniques shown in the figures can be implemented using code and data stored and executed on one or more computers. Such computers store and communicate (internally and with other computers over a network) code and data using machine-readable media, such as machine storage media (e.g., magnetic disks; optical disks; random access memory; read only memory; flash memory devices) and machine communication media (e.g., electrical, optical, acoustical or other form of propagated signals—such as carrier waves, infrared signals, digital signals, etc.). In addition, such computers typically include a set of one or more processors coupled to one or more other components, such as a storage device, a number of user input/output devices (e.g., a keyboard and a display), and a network connection. The coupling of the set of processors and other components is typically through one or more busses and bridges (also termed as bus controllers). The storage device and network traffic respectively represent one or more machine storage media and machine communication media. Thus, the storage device of a given computer system typically stores code and data for execution on the set of one or more processors of that computer. Of course, one or more parts of an embodiment of the invention may be implemented using different combinations of software, firmware, and/or hardware.

Figure 5:
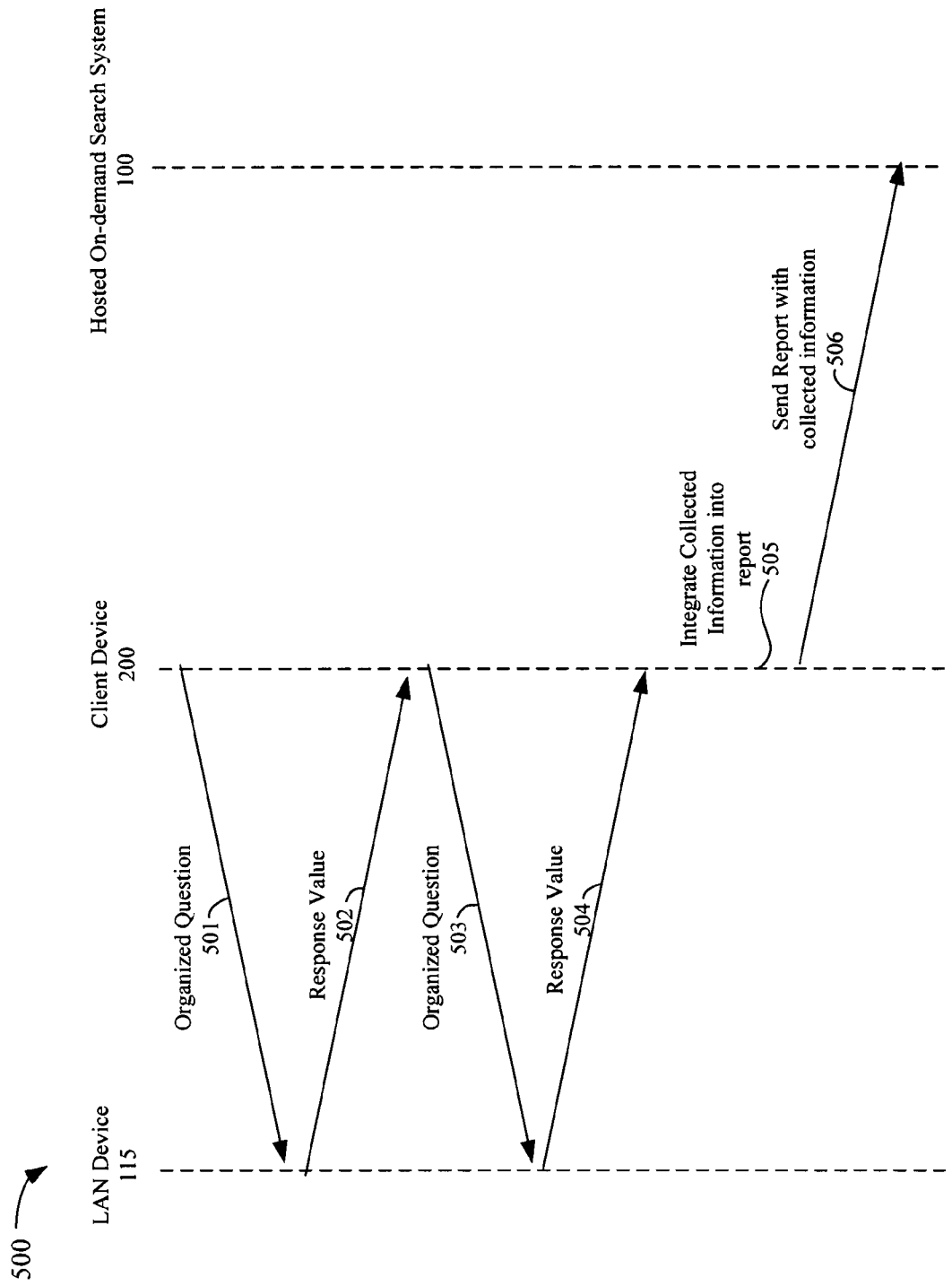
FIG. 5 illustrates an exemplary flow diagram of the LAN crawler of the client device according to one embodiment of the invention.

FIG. 5 illustrates an exemplary flow diagram 500 of the LAN crawler 111 of the client device 200 according to one embodiment of the invention. As described above, the LAN crawler 111 is configured to attempt to collect the descriptive information from the multiple disparate information sources 203 through a set of one or more organized questions to the devices 115 of the private LAN being crawled. In particular, the collection module 112 receives values, including descriptive information of the first set of items of interest, in response to the set of organized questions from the disparate information sources 203. As depicted in FIG. 5, as part of the flow diagram 500, the LAN crawler 111 of the client device 200 asks a first organized question 501 of a particular LAN device 115. The LAN device 115 responds to the first organized question 501 with a first response value 502. The LAN crawler 111 of the client device 200 then asks a second organized question 503 of the same LAN device 115 or a different LAN device 115. The LAN device 115 response to the second organized questions 503 with a second response value 504. The LAN crawler 111 then integrates the collected information (e.g., organized questions and corresponding response values) into a report, operation 505, and sends the report with the collected information to the hosted on-demand search system 100, operation 506. As described above, the collected information in the report is implicitly organized by nature of asking organized questions and receiving the corresponding response values in response to the organized questions. In another embodiment, the LAN crawler 111 collects information in a non-organized fashion and organizes the collected information before integrating the collected information into the report at operation 505. Also, as described above, the collected information may later be reorganized by the hosted on-demand search server 100 (e.g., reorganization module 126).

In the embodiment above, two organized questions 501 and 503 were asked of one or more LAN devices 115. In other embodiments, more or less organized questions may be asked of one or more LAN devices 115. The reports may include one or more organized questions and corresponding value(s). In one embodiment, the reports are sent periodically over the Internet to the hosted on-demand search system 100. In another embodiment, the reports are sent once they are integrated with a set of one or more organized questions and corresponding values. Alternatively, the reports may be sent on a scheduled basis. The collected information may be stored temporarily and independently of, or as part of the report, in memory before sending the report to the hosted on-demand search system 100, such as in the data store 230.

Figure 6:
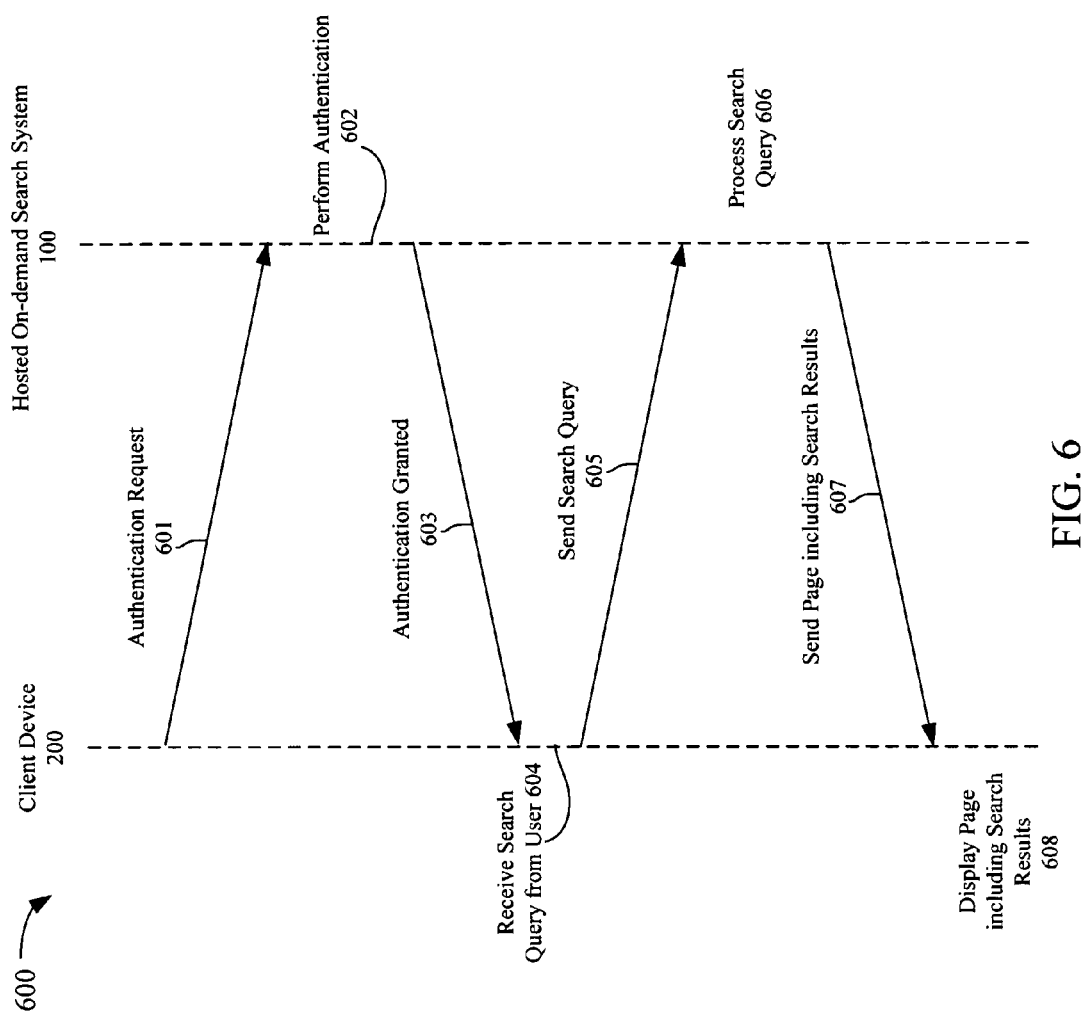
FIG. 6 illustrate an exemplary flow diagram of a private search according to one embodiment of the invention.

FIG. 6 illustrate an exemplary flow diagram 600 of a private search according to one embodiment of the invention. As described above, the server user interface module 124 of the hosted on-demand search system 100 is configured to receive a search query from a user of the private LAN 101 to perform a private search of the corresponding private search database 121. As part of the flow diagram 600, the user interface 110 of the client device sends an authentication request 601 to the server user interface module 124 of the hosted on-demand search system 100. The server user interface module 124 performs the authentication, in response to receiving the authentication request 601, operation 602. The server user interface module 124, for example, may authenticate the user by looking up user's authentication information stored in the configuration database 125. The authentication information stored in the configuration database 125 may be compared against the user authentication information sent in the authentication request 601. If the user is not authenticated, the server user interface module 124 may send a response to the client device 200 to indicate that authentication failed (not illustrated). However, if the user is authenticated in operation 602, the server user interface module 124 responds to the client device 200 to indicate that the authentication is granted 603. The authentication process may occur every time a user submits a search query, or alternatively, the authentication process may occur when the user first logs on to the hosted on-demand search system 100 using the user interface 110, for example, for each session. Although the authentication process is not necessary to receive a search query from a user, the authentication process may add additional security to the hosted on-demand search system 100.

Figure 8:
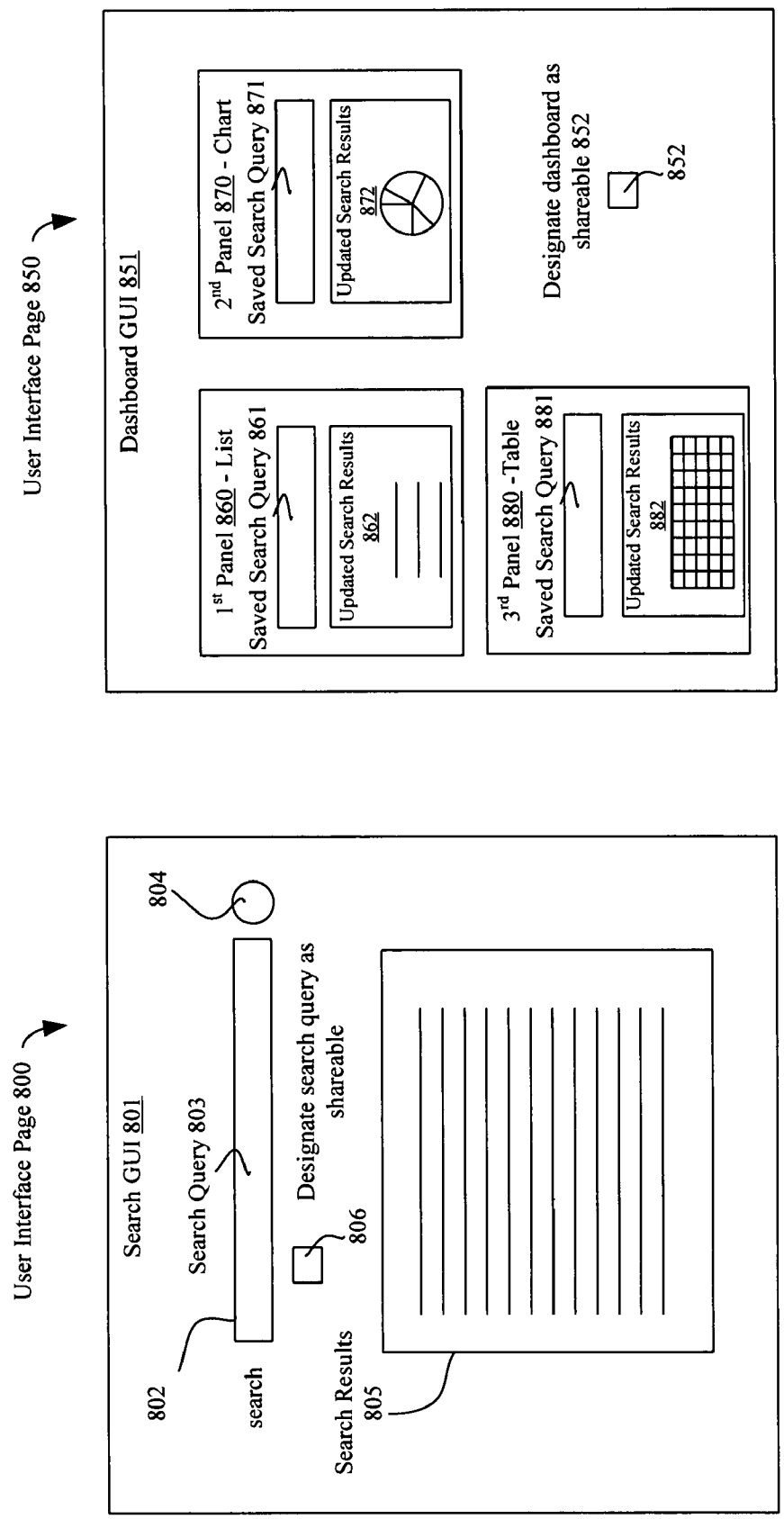
FIG. 8 illustrates exemplary user interface pages of the user interface on the client device according to one embodiment of the invention.

Once the user has been authenticated, the user interface 110 can receive a search query from the user, operation 604. FIG. 8 illustrates a search GUI 801 of a user interface page 800 on the user interface 110 that includes a first interface widget 802 to receive a search query 803 from the user, operation 604. Once the user has typed in the search query 803, the user may then select, or otherwise activate, a second interface widget 804, to send the search query 803 to the hosted on-demand search system 100, operation 605. The server user interface module 124 receives the search query 803 and processes the search query, operation 606. The operation 606 may include sending the search query 803 to the database interface 122 to perform a private search in the corresponding search database 121 that corresponds to the private LAN from which the user originated the search request. The database interface 122 returns the search results to the server user interface module 124. The server user interface module 124 may generate the user interface page 800, including include the search results 805, for the search GUI 801. The server user interface module 124 sends the generated user interface page 800, including the search results 805, to the client device 200 to be displayed, operation 607. The client device 200 then displays the user interface page 800, including the search results 805, as part of the search GUI 801, operation 608. In one embodiment, the search results 805 are displayed to look like search results from typical web search engines, such as with a small snippet of information including the context for the matching fields. Alternatively, the search results 805 may be displayed in other ways.

In one embodiment, the search query 803 is used to retrieve aggregate values, such as the number of devices 115 which are in a wireless access point class (e.g., "wifi_ap"). In another embodiment, the search query 803 is used to retrieve exact matches based on structure, for example, finding all devices on which a particular software application has been installed. This may be useful in knowing how many licenses of the particular software applications are being used on the private LAN, such as for software licensing audits, or the like. In another embodiment, the search query is used to retrieve matches of similar items that use different terminology. In another embodiment, the search query can be modified to refine a search, such as by clicking on aspects of a search result to refine the search, or to focus on the detailed information about the resource found.

In one embodiment, the search query 803 can be designated as shareable with other users, even users outside of the private LAN in which the user is conducting the private search. As illustrated in FIG. 8, the search GUI 801 includes a third interface widget 806 that allows a user to designate the search query 803 as shareable. Once the user has designated the search query 803 as shareable, when the user selects, or otherwise activates the second interface widget, the designation information is sent with the search query 803 to the server user interface module 124. The server user interface module 124 stores the saved search query 803 in the configuration database 125 for later retrieval by the user or by other uses in, or outside, the private LAN. It should be noted that the server user interface module 124 is configured to store the search query 803 when designated as shareable, but not the search results 805. By designating the search query 803 as shareable, the server user interface module 124 is able to allow display and selection of the stored search query 803 by another user, for example, users of a different private LAN. In another embodiment, additional interface widgets may be used, such as, for example, one to designate a search query as shareable with the user's colleagues, another to designate a search query as shareable with a community, and another to designate a search query as shareable with the public. Once the interface widgets have been selected, another interface widget can be selected to save the search query or queries.

Although the embodiment above describes sending the search query 803 that is received from the user in operation 604, alternatively, the search query that is sent in operation 605 may also be a saved search query that is stored on the client device 200. Alternatively, instead of sending the search query 803 in operation 605, the client device 200 may send a request to perform a private search based on a saved search query that is stored on the hosted on-demand search system 100.

In one embodiment, as illustrated in FIG. 8, the user interface 110 may display a user interface page 850 that includes a dashboard GUI 851. As described above, a dashboard is a GUI widget that can be part of the user interface page 850, and can be configured and saved by the user to display search results in various forms for saved search queries. For example, the user interface page 850 includes three dashboard panels 860, 870, and 880. The first panel 860 includes the saved search query 861, and displays the updated search results 862 in the form of a list when the dashboard GUI 851 is refreshed (e.g., when the user first accesses the dashboard and/or periodically thereafter). The second panel 870 includes the saved search query 871, and displays the updated search results 872 in the form of a chart when the dashboard GUI 851 is refreshed. The third panel 880 includes the saved search query 881, and displays the updated search results 882 in the form of a table when the dashboard GUI 851 is refreshed. Each of the dashboard panels 860, 870, and 880 may include updated search results for separate saved search queries, or alternatively, for the same search queries.

As described above, the collection of dashboard panels 860, 870, and 880 may include saved configurations of the dashboard (e.g., search queries, such as the placement on the dashboard GUI, the number of search results to display, the form to display the search results, or the like). These configurations may be stored for each user on the multiple private LANs. In one embodiment, the dashboard configuration of the dashboard GUI 851 can be designated as shareable to be shared with users of the same or different private LANs. For example, the dashboard GUI 851 may include an interface widget 852, which when selected, or otherwise activated, designates the dashboard to be shareable. The dashboard configuration may be saved locally on the client device 200 (e.g., in data store 230), and/or sent to the hosted on-demand search system 100 to be stored in the configuration database 125 for later retrieval by the user and/or users of the same or different private LANs. In one embodiment, the user may save the dashboard configuration with a saved search query so that when the user logs in, the dashboard GUI 851 is displayed with updated search results for the saved search query without having to manually enter the search query again.

Although the embodiment above includes a single interface widget 852 to designate the dashboard configuration of the dashboard GUI 851, in other embodiments, the configurations of the dashboard panels 860, 870, and 880, can be individually or collectively saved for later retrieval by the user and/or other users of the same private LAN or different private LANs.

Figure 7:
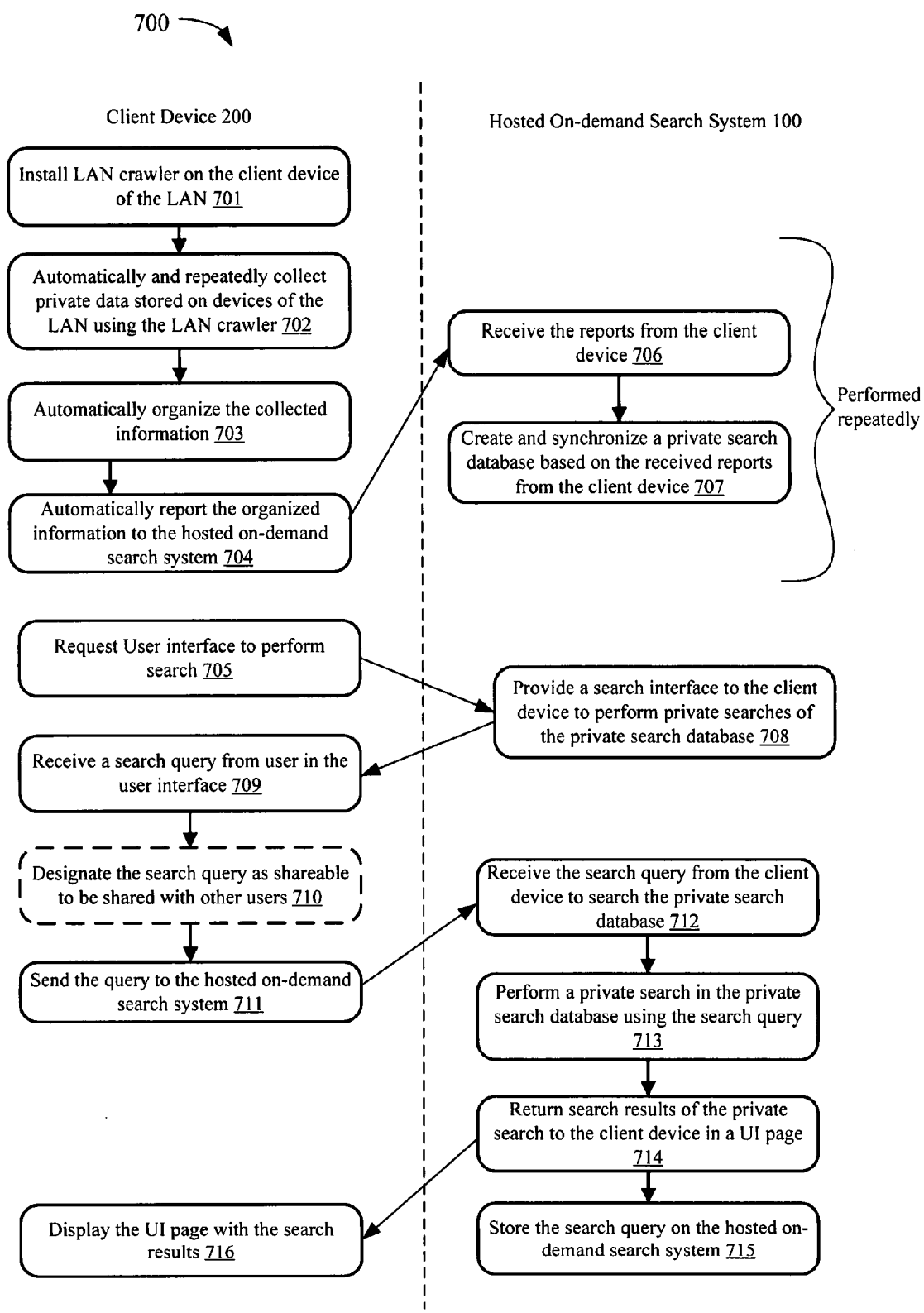
FIG. 7 illustrates an exemplary flow chart of operations between the client device and the hosted on-demand search system according to one embodiment of the invention.

FIG. 7 illustrates an exemplary flow chart of a method 700 of operations between the client device 200 and the hosted on-demand search system 100 according to one embodiment of the invention. The method 700 may start with a user on the client device 200 requesting the LAN crawler 111 from the hosted on-demand search system 100. This request may be made by the user through an Internet browser, or otherwise, to the distribution module 127 of the server user interface module 124. For example, the user, visiting a website hosted by the company or organization that manages the hosted on-demand search system 100, may click on a link to download the LAN crawler 111 to the client device 200. The LAN crawler 111 may also be provided in other forms, such as on a compact disc, or the like.

On the client side, the user then installs the LAN crawler 111 on the client device 200 of the private LAN 101, operation 701. As described above, the LAN crawler 111 automatically and repeatedly collects private data stored on the devices 115 of the private LAN 101 using the LAN crawler 111, operation 702; automatically organizes the collected information, operation 703; and automatically reports the organized information to the hosted on-demand search system 100, operation 704. As described above, the LAN crawler 111 may collect from multiple disparate information sources, only those parts of the disparate information sources that include descriptive information of the first set of items of interest. These items of interests may be collected from the multiple disparate information sources 203. Also, the LAN crawler 111 may be configured to organize the collected information by using organized questions. The LAN crawler 111 may also organize the collected information using the organization module 114. After the user has installed the LAN crawler 111 and the LAN crawler 111 has started to report the collected information to the hosted on-demand search system 100, the user requests the user interface 110 from the hosted on-demand search system 100, operation 705. This may be done by the user accessing a website and logging into an account using a username and password. Alternatively, the user may request the user interface 110 in other ways, such as launching an application that requests and displays the user interface 110.

On the server side, the hosted on-demand search system 100 receives the reports from the client device 200, operation 706. Based on the received reports, the hosted on-demand search system 100 creates and synchronizes a private search database 121, operation 707. The hosted on-demand search system 100, upon request (e.g. operation 705), provides the user interface 110, such as the search GUI 801, to the client device 200, operation 708. The user interface 110 allows the user to perform one or more private searches of the private search database 121.

In one embodiment, once the LAN crawler 111 has been installed, the operations 702-704 on the client side, and operation 706 and 707 on the server side may be performed automatically and repeatedly. For example, the LAN crawler 111 may be configured to automatically and repeatedly collect the private data from devices 115 of the private LAN 101. This may be configured to be periodic at scheduled intervals, to be continuous, to be only in response to discovery of new devices 115 on the private LAN, or the like. In another embodiment, once the LAN crawler 111 has been installed, the operations 702-704 may be performed manually in response to a user request.

On the client side, using the provided user interface 110, the client device 200 receives a search query from a user, operation 709. For example, the user may type in a search query 803 in the first interface widget 802. Alternatively, the user may select a saved search query 803, such as from a drop-down list of saved searches. The drop-down list may include search queries that are already included in the hosted on-demand search system 100, search queries that the user has previously saved, search queries that user's colleagues has previously saved, search queries that have been previously saved by the community, or the like. The user may designate the search query as shareable to be shared with other users, including users of other private LANs, operation 710. The user may designate the search query 803 by selecting the third interface widget 806, which may be a check box, a radio button, or the like. Alternatively, the user may chose to not designate the search query 803 as shareable, keeping the search query 803 private to the private LAN 101. The user then selects, or otherwise activates, the second interface widget 804, which sends the search query to the hosted on-demand search system 100, operation 711.

On the server side, the hosted on-demand search system 100 receives the search query from the client device 200 to search the private search database, operation 712. The hosted on-demand search system 100 performs a private search in the corresponding private search database 121 using the search query, operation 713. The hosted on-demand search system 100 returns the search results of the private search to the client device 200 in a user interface page, operation 714. For example, the hosted on-demand search system 100 generates the user interface page 800 that includes the search results 805 and sends the generated page to the client device 200 to be displayed. The hosted on-demand search system 100 also stores the search query, for example, in the configuration database 125, operation 715.

On the client side, the client device 200 receives the generated user interface page with the search results and displays the user interface page to the user, operation 716. The user may then review the search results, modify the search query to perform an additional search, search for additional items within the search results, type in another search query, save the search query, or the like. The user may also designate the search query as shareable after the user has received the search results. For example, the user may select the third interface widget 806 to designate the search query 803 as shareable. The user interface may send a request to the hosted on-demand search system 100 to modify the saved search query 803, which was previously stored in the configuration database 125, to be designated as shareable, instead of private.

Although the operations of FIG. 7 have been described and illustrated as performing a private search in response to a search query received from a user, in other embodiments, private searches may be performed in response to saved search queries, such as saved search queries of a dashboard GUI. For example, upon launching the dashboard GUI 851, the client device 200 sends the saved search queries 861, 871, and 881 to the hosed on-demand search system 100, performs the corresponding private searches using the search queries 861, 871, and 881, returning the updated search results 862, 872, and 882 to be displayed in the dashboard panels 860, 870, and 880, respectively. Also, the dashboard panels 860, 870, and 880 or the dashboard GUI 851 may be designated as shareable (e.g., selecting the interface widget 852). The user interface may send a request to the hosted on-demand search system 100 to save, and designated as shareable, the dashboard configurations in the configuration database 125 for later retrieval by the user and other uses, including users of other private LANs. The configuration of the dashboard panels 860, 870, and 880 or the dashboard GUI 851 may be modified before or after the private searches have been performed. If performed after the private searches have been performed, an additional request may be sent to designate the previously saved dashboard configuration as shareable.

Figure 9:
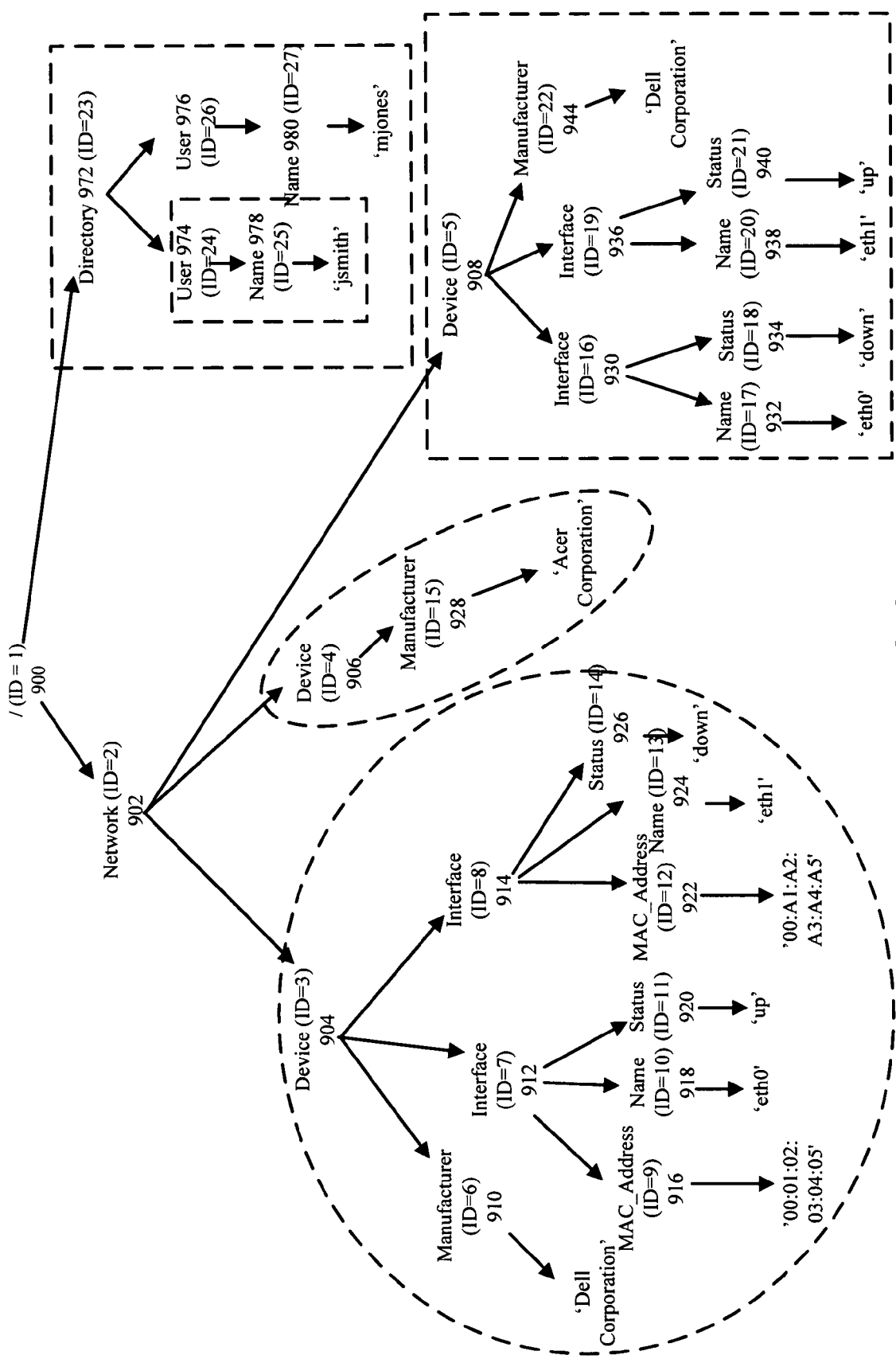
FIG. 9 illustrates an exemplary embodiment of a private search database that is a hierarchical database that stores the collected information in a tree structure according to one embodiment of the invention.

FIG. 9 illustrates an exemplary embodiment of a private search database that is a hierarchical database that stores the collected information in a tree structure according to one embodiment of the invention. In FIG. 9, the data of hierarchical database 110 is organized into a tree structure. Each data element (i.e., not a value) on the tree is a node of the tree. Each node on the tree has a corresponding unique identifier (e.g., a node identifier). For example, network node 902 has a unique identifier of two. At the top of the tree structure is the root node 900 of the tree, which is represented by the symbol /. The node can be described by a unique path, where each branch of the tree corresponds to a slash (/) in the path. For example, the path may be /network/device/interface/name. Directly below the root node exists two child nodes, network 902 and directory 972. A child node is a node, not a value, that itself descends from a node (e.g., a parent node or root node). Each parent node can have many child nodes, but each child node only has one parent. A child node may also be a parent node. For example, network 902 and directory 972 each are parent nodes in addition to being child nodes because they include one or more child nodes.

In addition, network 902 and directory 972 are each root nodes of a sub-tree. A sub-tree is a subset of the tree. A sub-tree includes information starting at the sub-tree root node and traversing through each child node of the sub-tree root node and ending with at least one value. Any node on the tree that itself has nodes below it (e.g., a parent node) can be referred to as a sub-tree root node. Thus, each sub-tree may include other sub-trees (i.e., the sub-trees may be nested within a sub-tree). There are many sub-trees in FIG. 9. For example as previously described, a sub-tree where network 902 is the sub-tree root node includes all the information, including values, from the nodes device 904, device 906 (which includes the node manufacturer 928), and device 908. As an example of a nested sub-tree, device 904 is a sub-tree root node for the sub-tree that includes all the information, including values, from the nodes manufacturer 910, interface 912, and interface 914. The interface 912 node includes the MAC Address 916, Name 918, Status 920, and the interface 914 node includes MAC Address 922, name 924, and Status 926. As another example of a nested sub-tree, device 908 is a sub-tree root node for the sub-tree that includes all the information, including values, from the nodes interface 930, interface 936, manufacturer 944, names 932, 934, 938, and status 940. As another example of a nested sub-tree, the directory 972 includes the nodes users 974 and users 976, which include the nodes name 978 and names 980, respectively.

Values are associated with leaf nodes. For example, the node manufacturer 910 is a leaf node because it is associated with the value 910 'Dell Corporation'. While in one embodiment of the invention values are only associated with leaf nodes, in alternative embodiments of the invention any node in the hierarchy can have values associated with that node.

In one embodiment, the LAN crawler 111 collects information about the private LAN being crawled (e.g., network assets) and sends it to the hosted on-demand search system to be stored in the private search database, which stores the data in a tree-structured format. As illustrated in FIG. 9, the collected information is visually represented in an inverted tree structure with the root at the top, and each data element as a node on the tree. The hierarchical database is useful because it provides the flexibility to scale and the ability to group related information and display the relationships.

The hierarchical database provides the ability to provide quantitative answers to questions, such as questions regarding IT information of a private LAN. The LAN crawler 111 collects information in an organized manner that lends itself to be stored in a tree structure. The hierarchical database may maintain the organization or structure of the information collected by the LAN crawler 111. For example, if you search the private search database for 'Tetris', a full-text search algorithm finds every instance of 'Tetris', including a computer named 'Tetris' and a software program named 'Tetris.' Because the LAN crawler knows how it collected the information for each, including how to identify the computer which has the name, and the network to which that computer belongs, and the identity of the computer which has the software installed, this organization can be maintained in the private search database using a hierarchical database. Using the hierarchical database, the hosted on-demand search system can know the difference between the computer named 'Tetris' and a software program named 'Tetris,' because of the relationships between the computer and the software in the hierarchical database.

Figure 10:
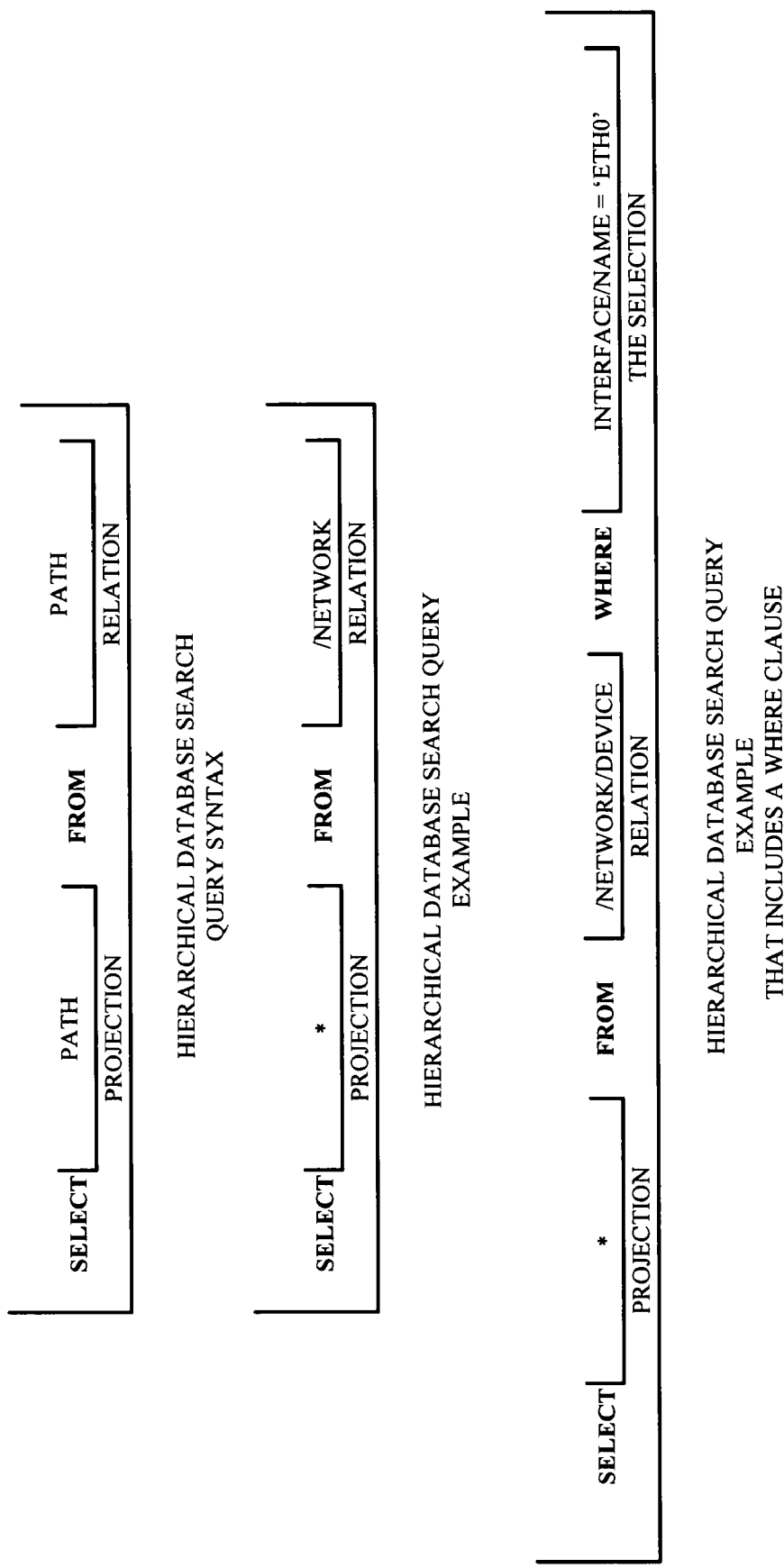
FIG. 10 illustrates exemplary search syntaxes for searching a hierarchical database according to one embodiment of the invention.

As many database users are familiar with SQL, according to one embodiment of the invention the hierarchical database is searched with a query syntax that is familiar to SQL uses. For example, FIG. 10 illustrates exemplary search syntaxes for searching a hierarchical database according to one embodiment of the invention. For example a simple hierarchical database search query syntax may take the form of SELECT*FROM /Network. Similarly to SQL, the SELECT clause in the query is used to specify the data returned subject to the FROM clause. In the above simple example, the asterisk indicates that everything in the hierarchical database is to be returned subject to the FROM clause (e.g., the network node). In the case of a tree, everything in the tree will be returned subject to the FROM clause. Also similar to SQL, the FROM clause describes from where in the database information should be returned. In the case of a tree, the FROM clause represents which sub-tree the data will be searched from. Also similar to SQL, a WHERE clause may be used to specify the selection. In other words, the WHERE clause restricts or filters the data returned. An example of a search query with a WHERE clause is SELECT*FROM /Network/Device WHERE Interface/Name='eth0'. It should be understood that the above search syntaxes are exemplary and that many other syntaxes as known in the art to search a hierarchical database may be used.

According to another embodiment of the invention, the private search database illustrated as a hierarchical database in FIG. 9 also may be used to generate data in an unstructured database (e.g., an inverted index, a forward index, a trie, a vector space model, etc.). For example, virtual documents may be created from the hierarchical database. A virtual document is used to refer to representation of data as textual data that may be indexed into an unstructured database. Referring to FIG. 9, the virtual documents that are created are represented by the dashed lines. Once virtual documents are created, the unstructured database and the hierarchical database may be searched with a single search query to allow keyword based searching of the unstructured database while retaining the searching of the hierarchical database. For example, the single search query may take the form of SELECT*FROM %Dell% where the unstructured search string %Dell% is used to search the unstructured database (e.g., the virtual documents within the unstructured database) for the string 'dell'. As there are two virtual documents that include the term 'Dell', both of the sub-trees representing those virtual documents are returned as a result.

For example in one embodiment of the invention the data stored in a hierarchical database includes information regarding substantially all devices within a private LAN, a list of software installed on those devices, and a list of users authorized to use those devices. Additionally, the data stored may include information regarding the operating system version installed on substantially all devices within the private LAN, the software which is running on substantially all devices within the private LAN, and a configuration file from at least one router, switch, or firewall within the private LAN. The devices may include substantially all workstations within a private LAN, substantially all routers within the private LAN, substantially all switches within the private LAN, substantially all servers within the private LAN, substantially all firewalls within the private LAN, and substantially all directory servers within the private LAN.

Another Embodiment of the Invention

Having described embodiment(s) of the invention, alternative embodiment(s) will now be described. Like the previous embodiment(s), these alternative embodiment(s) allow for hosted searching of information. However, unlike the previous embodiment(s), these embodiment(s) allow for hosted searching information for information that is not limited to private LAN information, as described above, but may include other types of information, such as financial information, enterprise information, traffic statistics from web-sites, transaction statistics from a database system, trading volumes from a stock trading application, resource usage and resource availability in a MRP system or a Enterprise Resource Planning (ERP) system, sales forecast information from a customer relationship management (CRM) system, or the like.

Alternative Embodiments

While embodiments of the invention has been described in relation to collecting private LAN information stored on devices of a private LAN, such as technical information from devices of the private LAN, other embodiments may include collecting other types of information, as described above, from other types of information sources on devices of public networks, private and public networks, or the like. Therefore, embodiments of the invention are not limited to collecting private LAN information. In addition, while embodiments of the invention have been described in relation to technical information stored in devices of the private LAN, alternative embodiments could be implemented such that other types of information may be collected from information sources of devices of public networks, private and public networks, or the like. Such an embodiment could be implemented by having the LAN crawler ask one or more questions of the devices to collect the other types of information.

For example, while the flow diagrams in the figures show a particular order of operations performed by certain embodiments of the invention, it should be understood that such order is exemplary (e.g., alternative embodiments may perform the operations in a different order, combine certain operations, overlap certain operations, etc.)

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. An apparatus for hosted searching of different private local area network (LAN) information comprising:
a LAN crawler to automatically and repeatedly crawl a LAN having a plurality of devices, said LAN crawler including,
    a collection module to attempt to collect, from across each of a plurality of disparate information sources stored in the plurality of devices, only those parts of the disparate information sources that include descriptive information of a first plurality of items of interest, wherein for at least one of the first plurality items of interest, the parts are collected from multiple ones of the plurality of disparate information sources, and
    a reporting module to automatically report the collected information organized according to the first plurality of items of interest out of a firewall of the private LAN being crawled and over the Internet; and
a hosted on-demand search system to be coupled to the Internet including, a set of one or more centralized-search servers including,
    a crawler interface to receive the reports of different instances of the LAN crawler deployed on a plurality of different private LANs at least some of which are operated by different entities,
    a database interface to create and synchronize a separate private search database for each of the plurality of private LANs based on the received reports, wherein each of the private search databases includes the collected information collected from across the disparate information sources of that private LAN organized by the first plurality of items of interest, and wherein the private search databases are not organized by documents located on the plurality of private LANs,
    a server user interface module to provide a user interface over the Internet to each of the plurality of private LANs to perform private searches of their corresponding private search database, and a configuration database coupled to the server user interface module to store authentication information for access by the user interfaces and search queries;

wherein the descriptive information of the first plurality of items of interest include technical information regarding the plurality of private LANs, users of the plurality of private LANs, and the plurality of devices of the plurality of private LANs;

wherein the plurality of disparate information sources include a routing table of a router, a router configuration file of a router, an address resolution protocol (ARP) table of a switch, a bridging table of a switch, a switch configuration table of a switch, a software configuration file of a server, a resource utilization counter of a server, a log file of a server, custom application file of a server, user information of a directory server, group information of a directory server, a software configuration file of a workstation, a registry of a workstation, an operating system interface database of a workstation, a directory of a workstation, a resource utilization counter of a workstation, a log file of a workstation, and a configuration file of a network printer.

2. The apparatus of claim 1, wherein the server user interface module receives a search query from a user of the private LAN to perform a private search of the corresponding private search database, wherein the server user interface module is configured to store the search query in the configuration database for later retrieval by the user, wherein the server user interface module is configured to allow the stored search query, but not search results of the private search, to be designated for sharing, and to allow for display and selection of such the stored search query by the plurality of private LANs when the stored search query is designated as shareable.

3. The apparatus of claim 1, wherein said LAN crawler further includes an organization module to automatically organize the collected information according to the first plurality of items of interest.

4. The apparatus of claim 1, wherein the collection module is configured to attempt to collect the descriptive information from the plurality of disparate information sources through a set of one or more organized questions to the plurality of devices of the private LAN being crawled, the collection module receiving values in response to the set of organized questions from the plurality of disparate information sources, wherein the values, received in response to the set of organized questions, include descriptive information of the first plurality of items of interest.

5. The apparatus of claim 1, wherein the crawler interface receives the reports of different instances of the LAN crawler deployed on the plurality of different private LANs, distinguishes the reports to identify in which private search database a particular report is to be stored, and sends the distinguished reports to the database interface to be stored in the identified search database.

6. The apparatus of claim 5, wherein the crawler interface distinguishes the reports by sending an identifier of a received report to the configuration database, wherein the identifier identifies an entity that operates the private LAN, and receiving the identified search database that corresponds to the identifier from the configuration database, and wherein the reporting module of the LAN crawler is configured to periodically send the reports of the LAN crawler to the crawler interface.

7. The apparatus of claim 1, wherein the collection module comprises:
a discovery module to automatically discover the plurality of devices of the private LAN being crawled; and
a probing module to attempt to collect data from each of the plurality of disparate information sources stored in the discovered devices.

8. The apparatus of claim 1, wherein at least some of the private search databases are each a hierarchical database, wherein the hierarchical database includes one or more sub-trees branching from a tree root node, wherein each sub-tree includes one or more nodes starting at a sub-tree root node, and wherein each node has a unique identifier, and wherein each hierarchical database is searched with a search query that includes a SELECT clause and a FROM clause, wherein the SELECT clause includes syntax to identify a path in the hierarchical database starting at a root of the hierarchy, and wherein the FROM clause describes from where in the hierarchical database information should be returned.

9. The apparatus of claim 1, wherein the set of one or more centralized-search servers comprises a reorganization module to reorganize the collected information received in the reports, the reorganization module including,
a report scanning module to attempt to collect, from across the reports, descriptive information of a second plurality of items of interest; and
an integration module to integrate the collected descriptive information of the second plurality of items of interest organized according to the second plurality of items of interest into the corresponding private search database.

10. The apparatus of claim 1, wherein the set of one or more centralized-search servers comprises a reorganization module to reorganize the collected information received in the reports, the reorganization module including,
a report scanning module to attempt to identify from among the first plurality of items of interests, similar items having different terminology,
a renaming module to rename the similar items to have a common terminology for searching, and
an integration module to integrate the collected information of the reports and the renamed similar items into the corresponding private search database.

11. The apparatus of claim 1, wherein the LAN crawler is deployed on one of the plurality of devices in each of the plurality of different private LANs, the LAN crawler to collect values of the technical information from the plurality of disparate information sources stored on the plurality of devices of the LAN being crawled through a set of one or more organized questions to the plurality of devices of the private LAN being crawled.

12. The apparatus of claim 1, wherein the hosted on-demand search system further comprises a classification server coupled to a classification database and the set of one or more centralized-search servers, the classification server to compare the collected information of the private search databases against predetermined characteristics of known devices, and to compute a classification metric for each of the plurality of devices of each of the plurality of private LANs.

13. A method for hosted searching of different private local area network (LAN) information, comprising:
for each of the plurality of private LANs each having a plurality of devices, automatically and repeatedly crawling that private LAN to collect, from across each of a plurality of disparate information sources stored in the plurality of devices of that LAN, only those parts of the disparate information sources that include descriptive information of a first plurality of items of interest, wherein for at least one of the first plurality items of interest, the parts are collected from multiple ones of the plurality of disparate information sources;

for each of the plurality of private LANs, automatically reporting the collected information organized according to the first plurality of items of interest out of a firewall of the private LAN being crawled and over the Internet to a hosted on-demand search system;

receiving the reports from each of the plurality of private LANs, at the hosted on-demand search system;

creating and synchronizing a separate private search database for each of the plurality of private LANs based on the received reports, wherein each of the private search databases includes the descriptive information collected from across the disparate information sources of that private LAN organized by the first plurality of items of interest, and wherein the private search databases are not organized by documents located on the plurality of private LANs; and providing a user interface over the Internet to each of the plurality of private LANs to perform private searches of their corresponding private search database;

wherein the descriptive information of the first plurality of items of interest include technical information regarding the plurality of private LANs, users of the plurality of private LANs, and the plurality of devices of the plurality of private LANs;

wherein the plurality of disparate information sources include a routing table of a router, a router configuration file of a router, an address resolution, protocol (ARP) table of a switch, a bridging table of a switch, a switch configuration table of a switch, a software configuration file of a server, a resource utilization file of a server, a log file of a server, custom application information of a server, user information of a directory server, group information of a directory server, a software configuration file of a workstation, a resource utilization file of a workstation, and a log file of a workstation.

14. The method of claim 13, further comprising:
receiving a search query from a user of the private LAN to perform a private search of the corresponding private search database;
storing the search query in a configuration database for later retrieval; and
allowing display and selection of the stored search query, but not search results of the private search by the plurality of private LANs, through the user interface when the stored search query is designated as shareable.

15. The method of claim 13, wherein said automatically and repeatedly crawling comprises:
automatically discovering the plurality of devices of the private LAN being crawled; and
probing the discovered devices to collect data from each of the plurality of disparate information sources stored in the discovered devices.

16. The method of claim 13, further comprising:
organizing the collected information according to the first plurality of items of interest before reporting the collected information out of the firewall; and
integrating the organized information into the corresponding private search databases.

17. The method of claim 13, further comprising:
reorganizing the organized information of the received reports; and
integrating the reorganized information into the corresponding private search databases.

18. The method of claim 13, wherein said automatically and repeatedly crawling that private LAN to collect descriptive information comprises:
asking a set of one or more organized questions of the plurality of disparate information sources stored in the plurality of devices of the private LAN being crawled; and
receiving values in response to the set of organized questions from the plurality of disparate information sources, wherein the received values are the descriptive information of the first plurality of items of interest.

19. The method of claim 13, wherein said automatically and repeatedly crawling that private LAN to collect descriptive information comprises:
asking a set of one or more organized questions of the plurality of disparate information sources stored in the plurality of devices of the private LAN being crawled; and
receiving values of the technical information from the plurality of disparate information sources in response to the set of organized questions.

20. The method of claim 13, wherein at least some of the private search databases are each a hierarchical database, wherein the hierarchical database includes one or more sub-trees branching from a tree root node, wherein each sub-tree includes one or more nodes starting at a sub-tree root node, and wherein each node has a unique identifier, and wherein each hierarchical database is searched with a search query that includes a SELECT clause and a FROM clause, wherein the SELECT clause includes syntax to identify a path in the hierarchical database starting at a root of the hierarchy, and wherein the FROM clause describes where in the hierarchical database information should be returned from.

21. The method of claim 13, further comprising:
comparing the collected information of the private search databases against predetermined characteristics of known devices; and
computing a classification metric for each of the plurality of devices of each of the plurality of private LANs.

* * * * *